United States Patent [19]
Kusano et al.

[11] Patent Number: 5,492,394
[45] Date of Patent: Feb. 20, 1996

[54] HYDRAULIC BRAKING SYSTEM FOR AN AUTOMOTIVE VEHICLE

[75] Inventors: Akihito Kusano; Toru Watanabe, both of Toyota; Hiroshi Toda, Kariya; Hirokazu Yoshino, Toyota, all of Japan

[73] Assignee: Aisin Seiki Kabushiki Kaisha, Kariya, Japan

[21] Appl. No.: 360,583

[22] Filed: Dec. 21, 1994

[30] Foreign Application Priority Data

Dec. 21, 1993 [JP] Japan .................................. 5-322935
Mar. 9, 1994 [JP] Japan .................................. 6-038648

[51] Int. Cl.[6] .................................................. B60T 8/32
[52] U.S. Cl. .................................. 303/113.2; 303/113.5; 303/116.1; 303/119.1; 303/DIG. 2; 303/125; 303/139; 303/186; 303/189
[58] Field of Search ............................. 303/113.2, 113.3, 303/114.1, 119.1, 116.1, 113.5, 189, 188, 186, 125, 139, 140, 143, 6.01, DIG. 1, DIG. 2, 900, 901; 364/426.01, 426.02

[56] References Cited

U.S. PATENT DOCUMENTS 5,348,381  9/1994  Bernhardt et al. ............... 303/113.2
5,445,444  8/1995  Rump et al. ....................... 303/125

FOREIGN PATENT DOCUMENTS 63-110064  5/1988  Japan .
64-74153   3/1989  Japan .

Primary Examiner—Douglas C. Butler
Attorney, Agent, or Firm—Burns, Doane, Swecker & Mathis

[57] ABSTRACT

The invention is directed to a hydraulic braking system having a master cylinder (10) in which a first piston and a second piston are slidably disposed to define a first pressure chamber (11) and a second pressure chamber (12). A valve device (24) is provided between the first pressure chamber and a reservoir (20). A first pressure control device (30, 31) is provided between the first pressure chamber and wheel cylinders (38, 39), and a second pressure control device (32, 33) is provided between the second pressure chamber and wheel cylinders (40, 41). A pump (27) is provided in a passage connecting the reservoir and the first pressure control device, and driven to supply a brake pressure from the former to the latter. When the valve device is actuated to block the communication between the first pressure chamber and the reservoir, and the pump is driven, the pressure in the first pressure chamber will be increased to move the second piston, so that the pressure in the second pressure chamber will be increased. Accordingly, the pressure in each wheel cylinder may be controlled by the first or second pressure control device without depressing the brake pedal.

24 Claims, 16 Drawing Sheets

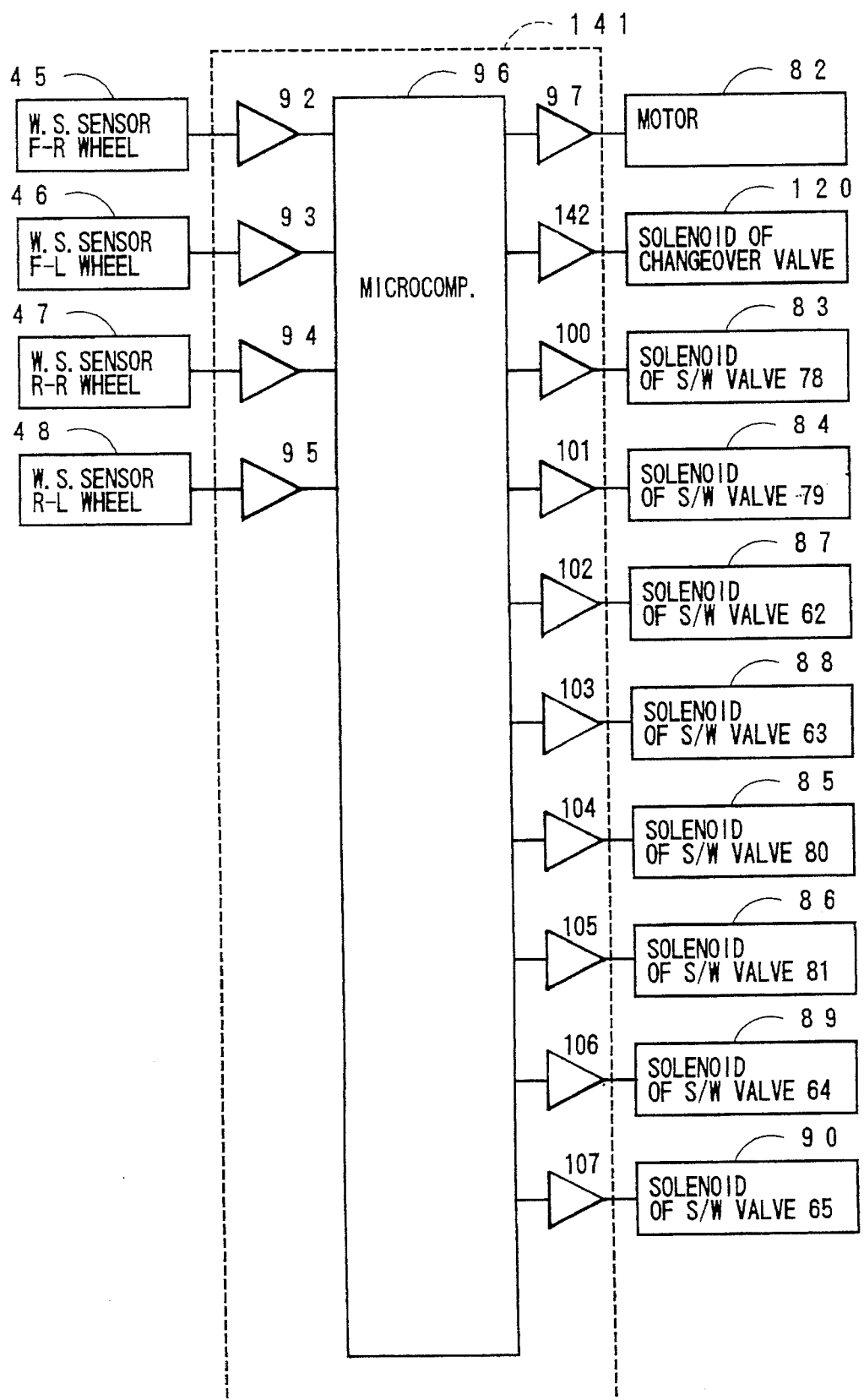

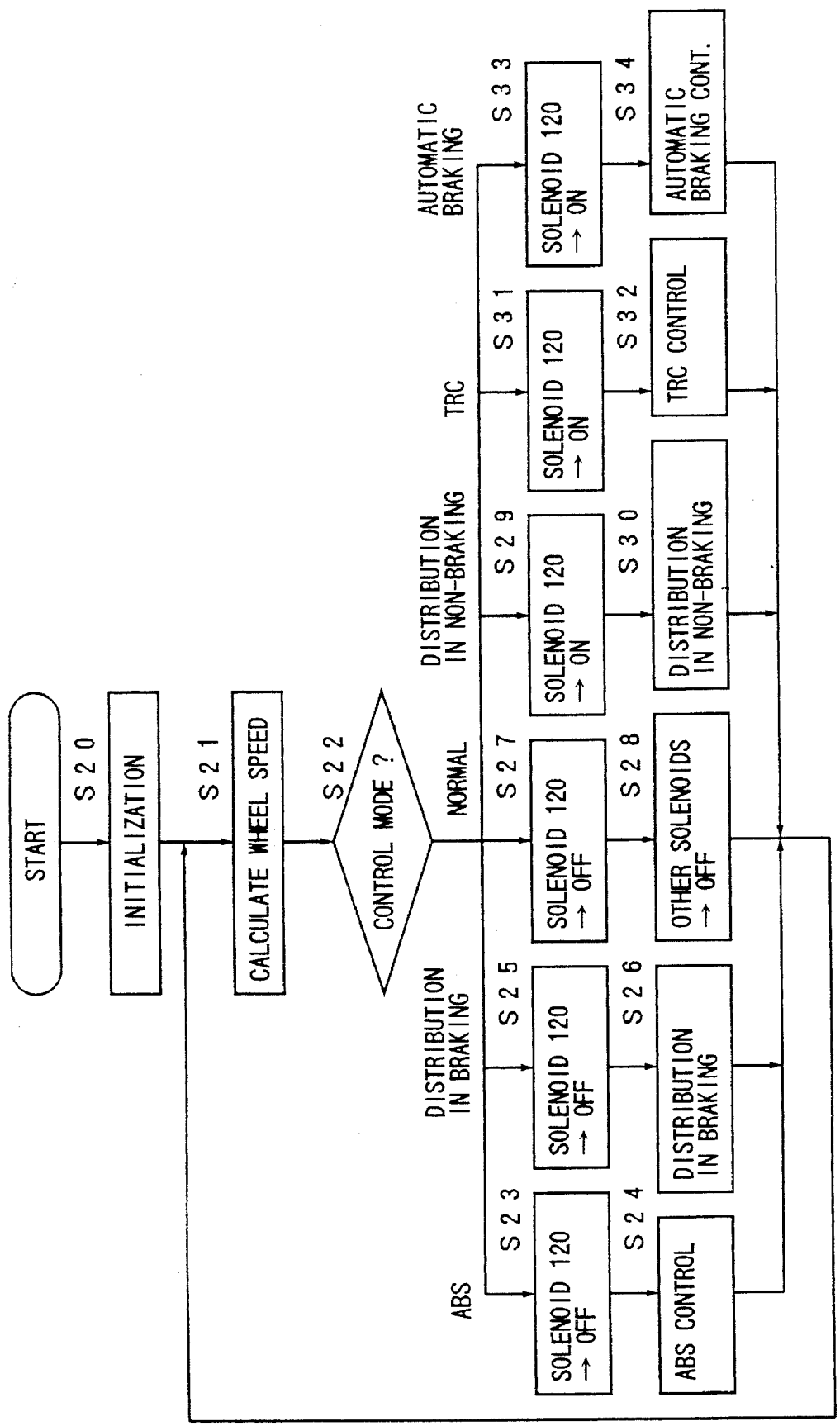

5,492,394

HYDRAULIC BRAKING SYSTEM FOR AN AUTOMOTIVE VEHICLE

BACKGROUND OF THE INVENTION

1. Field of the Invention

The present invention relates to a hydraulic braking system for use in an automotive vehicle, and more particularly to a hydraulic braking system for providing an anti-lock braking control mode to prevent a wheel from being locked, a traction control mode to prevent the wheel from slipping, an automatic braking mode, or the like.

2. Description of the Prior Art

In general, an automotive vehicle has four wheels of a front-left wheel, a front-right wheel, a rear-left wheel and a rear-right wheel, on each of which a wheel cylinder is operatively mounted. And, a hydraulic braking system for the vehicle is provided with a master cylinder for generating a master cylinder pressure in response to depression of a brake pedal, and a reservoir for supplying a brake fluid to the master cylinder. The master cylinder has two pressure chambers defined therein for supplying the pressure to one circuit of the front-left wheel and the front-right wheel, and the other circuit of the rear-left wheel and the rear-right wheel, or supplying the pressure to one circuit of the front-left wheel and the rear-right wheel, and the other circuit of the front-right wheel and the rear-left wheel. It is known that a control apparatus is provided between a master cylinder and a wheel cylinder to provide an anti-lock braking mode, as disclosed in Japanese Patent Laid-open publication No. 64-74153, for example. The apparatus is provided with a traction control changeover valve of a three-port and two-position type which is provided between the master cylinder and an anti-lock braking device. With the traction control changeover valve operated, when the brake pedal is depressed, the master cylinder communicates with the wheel cylinder through an anti-lock braking control valve. Therefore, a master cylinder pressure is supplied to the wheel cylinder through the anti-lock braking control valve, by which the anti-lock braking control is performed. When the brake pedal is not depressed, the master cylinder is connected to the wheel cylinder through a pump and the anti-lock braking control valve. Therefore, with the pump actuated, the pressure may be supplied from the pump to the wheel cylinder to enable the traction control, even if the brake pedal is not depressed.

In the hydraulic braking system as disclosed in Japanese Patent Laid-open publication No. 63-110064, a shut-off valve is provided between a reservoir and a master cylinder, and a relief valve is provided for blocking the communication between an inlet of the pump and the reservoir. In the traction control mode, the shut-off valve is actuated to block the communication between the master cylinder and the reservoir. In this condition, when the pump is driven to rotate, the brake fluid is supplied from the reservoir to the anti-lock braking control valve through the relief valve, so that the wheel may be braked, with the anti-lock braking control valve operated, even if the brake pedal is not depressed.

According to the above-described braking force control apparatus, however, in the case where the traction control, the automatic braking control or the like is performed, if the number of circuits with the anti-lock braking control devices is increased, the number of valves provided between the anti-lock braking control devices and the reservoir is increased to raise a manufacturing cost of the apparatus, at least.

Further, in the case where the wheel cylinders of more than two circuits are to be controlled, the brake fluid in each circuit must be pressurized by the pump. Generally, such a pump as the one employed in an anti-lock braking device of a recirculation type, is provided for feeding back the brake fluid stored in drain passages to the pressure chamber, so that its suction performance is not necessarily required to be high. In the case where the pump is required to suck the brake fluid from the reservoir, however, a relatively high suction performance is needed. The pump having such high suction performance is so costly that the cost of the system will be raised as a whole, especially in the case where the wheel cylinders in more than two circuits must be pressurized by the pump provided in each circuit.

SUMMARY OF THE INVENTION

Accordingly, it is an object of the present invention to provide a hydraulic braking system for an automotive vehicle which may control the pressure in a wheel cylinder disposed in each of a plurality of circuits in response to depression of a brake pedal, and also control the pressure without depressing the brake pedal, to provide the system with a simple structure at a low cost.

It is another object of the present invention to provide a hydraulic braking system for an automotive vehicle which may increase the pressure in a wheel cylinder more than the pressure generated in response to depression of a brake pedal, to improve a feeling given to a driver who depresses the brake pedal.

In accomplishing the above and other objects, a hydraulic braking system for an automotive vehicle is provided with a master cylinder which has a housing defining therein a bore, in which a first piston is slidably disposed to be moved in response to depression of a brake pedal. Also, a second piston is slidably disposed in the bore at the side of the first piston opposite to the brake pedal. Between the first piston and the second piston is defined a first pressure chamber, which communicates with a first port and a second port which are formed on the housing. A second chamber is defined at the side of the second piston opposite to the first chamber, and communicates with a third port and a fourth port which are formed on the housing. When the brake pedal is depressed, the first piston blocks the communication between the first port and the first pressure chamber, and second piston blocks the communication between the third port and the second pressure chamber, respectively. A reservoir is provided for storing an amount of brake fluid, and arranged to communicate with the third port of the master cylinder. A first valve device is provided between the first port of the master cylinder and the reservoir for opening or closing therebetween. The first valve device may be constituted by a solenoid operated switching valve, for example. A pump is disposed so as to communicate with the reservoir through its input port and communicate with the second port of the master cylinder through its output port. The pump is driven to suck the brake fluid from the reservoir and discharge the pumped brake fluid to the second port. A plurality of wheel cylinders are operatively mounted on respective wheels to brake the wheels, and divided into a first group of wheel cylinders and a second group of wheel cylinders. A first pressure control device is provided between the second port of the master cylinder and the first group of wheel cylinders to control the pressure in the second port. A second pressure control device is also provided between the fourth port of the master cylinder and the second group of wheel cylinders to control the pressure in the fourth port. And, a valve controller is provided for actuating the first valve device to open or close the communication between the first port of the master cylinder and the reservoir in accordance with a mode selected from an opening mode and a closing mode.

In the hydraulic braking system having the master cylinder as described above, a first anti-lock braking control device may be provided for controlling the pressure supplied from the second port of the master cylinder to the first group of wheel cylinders. The first anti-lock braking control device preferably includes an inlet valve which is provided between the second port and the first group of wheel cylinders respectively, a first drain passage which communicates the first group of wheel cylinders with the reservoir through an outlet valve which is provided in the first drain passage, respectively, and a first pump which is provided between the second port and the drain passage. A second anti-lock braking control device may be provided for controlling the pressure supplied from the fourth port of the master cylinder to the second group of wheel cylinders. The second anti-lock braking control device may include an inlet valve which may be provided between the fourth port and the second group of wheel cylinders respectively, a second drain passage which communicates the second group of wheel cylinders with the reservoir through an outlet valve which is provided in the second drain passage, respectively. In this system, a second valve device is provided for opening or closing the communication between the first drain passage and the reservoir, in addition to the first valve device. Then, the valve controller is arranged to actuate the first valve device and second valve device in accordance with a mode which is selected from a first mode for opening the first valve device and closing the second valve device, and a second mode for closing the first valve device and opening the second valve device.

In lieu of the first valve device and second valve device, a third valve device, e.g., a three-port two-position valve may be employed.

In the hydraulic braking system as described above, the master cylinder may further comprise a reservoir chamber which is defined by the first piston at the side thereof opposite to the first chamber. The reservoir chamber communicates with a fifth port which is formed on the housing, and has a volume which is varied in response to depression of the brake pedal. And, fourth valve device is preferably provided for selecting one of a first position for communicating the reservoir with the first port and the fifth port and blocking the communication between the reservoir and the drain passage, and a second position for communicating the reservoir with the drain passage and blocking the communication between the reservoir and the first and fifth ports. Then, the valve controller is arranged to actuate the fourth valve device in accordance with a mode selected from a first mode for selecting the first position, and a second mode for selecting the second position. This hydraulic braking system may further comprise one way valve which allows the brake fluid to flow from the reservoir to the fifth port and prevents the reverse flow of the brake fluid.

In the above-described systems, a second pump may be provided between the fourth port of the master cylinder and the second drain passage to suck the brake fluid from the latter and discharge the pumped brake fluid to the former. In lieu of the second pump, an auxiliary reservoir may be provided in the second drain passage. Or, the auxiliary reservoir may be omitted, and the second drain passage may be connected to the reservoir.

The pressure control device may be provided for a wheel cylinder to be controlled independently, or a pair of wheel cylinders to be controlled at the same time. The anti-lock braking control device may also be provided for a wheel cylinder to be controlled independently, or a pair of wheel cylinders to be controlled at the same time.

In the first drain passage, an auxiliary reservoir may be provided. In the case where the switching valve is employed as the inlet valve in the anti-lock braking control device, the pressure in the wheel cylinder may be increased, decreased, or held. In lieu of the switching valves connected to a wheel cylinder as the inlet valve and outlet valve, a three-port two-position valve may be employed.

A plurality of wheel cylinders may be divided into more than two groups of wheel cylinders to provide more than two circuits connected to more than two pressure chambers defined in the master cylinder.

BRIEF DESCRIPTION OF THE DRAWINGS

The above stated object and following description will become readily apparent with reference to the accompanying drawings in which:

FIG. 17 is a block diagram of an electronic control circuit in the sixth embodiment of the present invention; and FIG. 18 is a flowchart executed in the sixth embodiment of the present invention.

DESCRIPTION OF THE PREFERRED EMBODIMENTS

Figure 1:
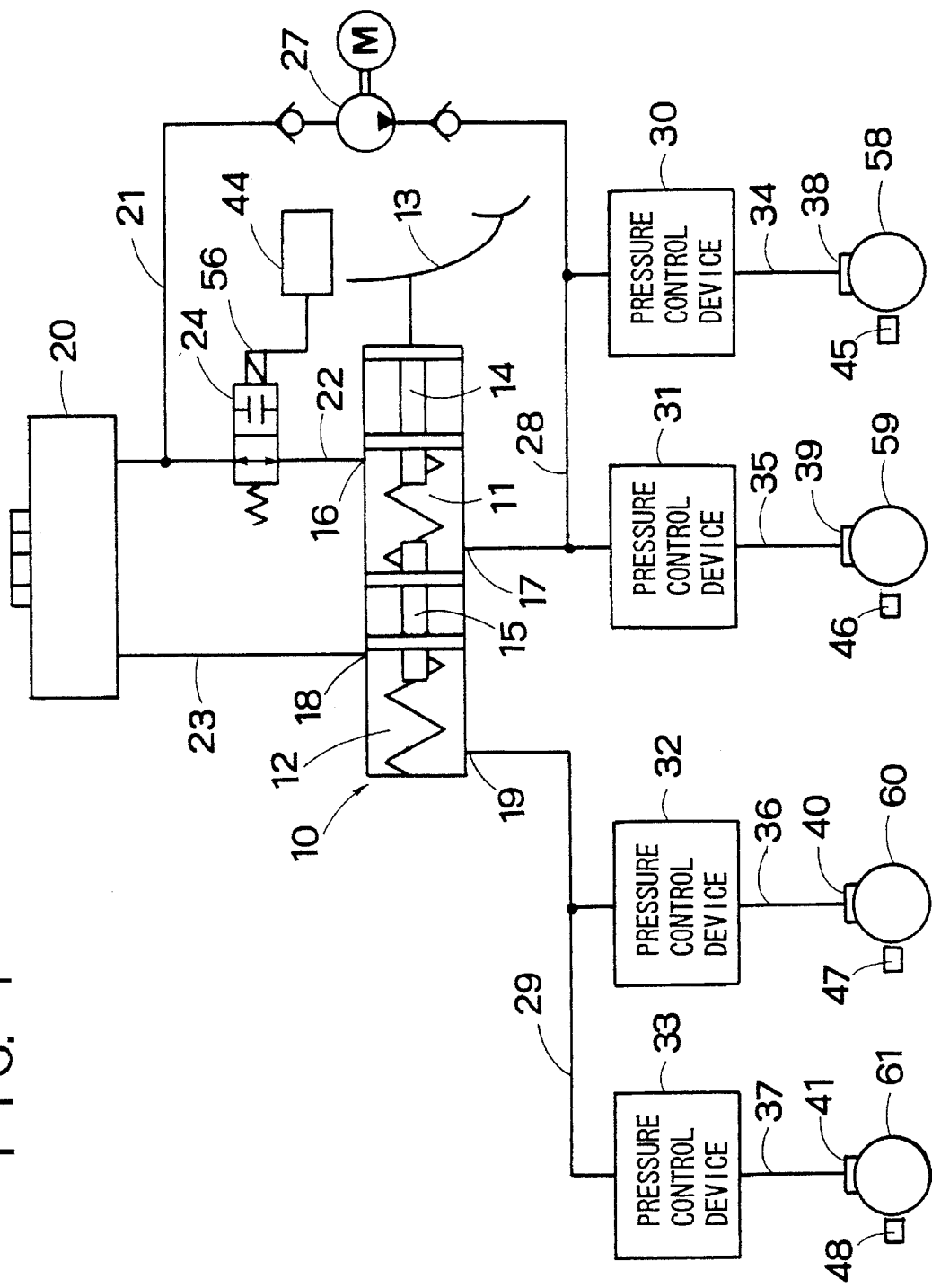
FIG. 1 is a schematic illustration of a first embodiment of a hydraulic braking system according to the present invention.

Referring to FIG. 1, there is illustrated a hydraulic braking system according to a first embodiment of the present invention, wherein a brake pedal 13 is connected to a master cylinder 10. Wheel cylinders 38 to 41 are operatively mounted on wheels 58 to 61 of a vehicle to apply the braking force to the wheels 58 to 61, respectively. Wheel speed sensors 45 to 48 are provided near the wheels 58 to 61, respectively, to detect a vehicle speed of each wheel. The master cylinder 10 according to the present embodiment is a tandem master cylinder which has a housing defined therein a bore to slidably receive a first piston 14 and a second piston 15, which define a first pressure chamber 11 and a second pressure chamber 12. The master cylinder 10 has a first port 16 and a second port 17 both of which are formed on the housing to communicate with the first pressure chamber 11, also a third port 18 and a fourth port 19 both of which are formed on the housing to communicate with the second pressure chamber 12. When the brake pedal 13 is depressed, the first piston 14 is moved to shut off the communication between the first port 16 and the first pressure chamber 11, and press the first pressure chamber 11 in response to depression of the brake pedal 13. Then, the second piston 15 is moved to shut off the communication between the third port 18 and the second pressure chamber 12, and press the second pressure chamber 12 in response to the pressure in the first pressure chamber 11. A reservoir 20 for storing an amount of brake fluid is disposed to communicate with the third port 18 of the master cylinder 10 through a passage 23. A first control valve 24 of a switching (open/close) valve is provided between the master cylinder 10 and the reservoir 20, and serves as a first valve device according to the present invention. The first control valve 24 communicates with the first port 16 of the master cylinder 10 through a passage 22, while it communicates with the reservoir 20 through a passage 21, to open or close the communication between the passage 21 and the passage 22.

Pressure control devices 30, 31 are provided between a passage 28 which communicates with the second port 17 of the master cylinder 10, and passages 34, 35 which communicate with the wheel cylinders 38, 39, respectively, to control the pressure which is discharged from the second port 17 and supplied to the wheel cylinders 38, 39. A fluid pump 27 is connected to the reservoir 20 at its input port through the passage 21, and connected to the second port 17 at its output port through the passage 28. The fluid pump 27 is provided with check valves which allow the flow of the brake fluid from its downstream side (i.e., the reservoir 20's side in FIG. 1) to its upstream side, and driven by an electric motor M. Pressure control devices 32, 33 are provided between a passage 29 which communicates with the fourth passage 19, and passages 36, 37 which communicate with the wheel cylinders 40, 41, respectively, to control the pressure which is discharged from the fourth passage 19 and supplied to the wheel cylinders 40, 41. An electronic control circuit 44 serves as a valve controller for controlling the operation of the first control valve 24, in accordance with a mode selected from a mode for opening the first control valve 24 and a mode for closing the first control valve 24.

In general, a diagonal circuit is employed for the hydraulic braking system of the FF vehicle (Front engine Front drive), while a front and rear distribution circuit is employed for that of the FR vehicle (Front engine Rear drive). According to the diagonal circuit, the wheels 58, 59 correspond to the front left wheel and the rear right wheel, respectively, while the wheels 60, 61 correspond to the front right wheel and rear left wheel, respectively. According to the front and rear distribution circuit, on the other hand, the wheels 58, 59 correspond to the front left wheel and the front right wheel, while the wheels 60, 61 correspond to the rear right wheel and rear left wheel, and vice versa.

Figure 2:
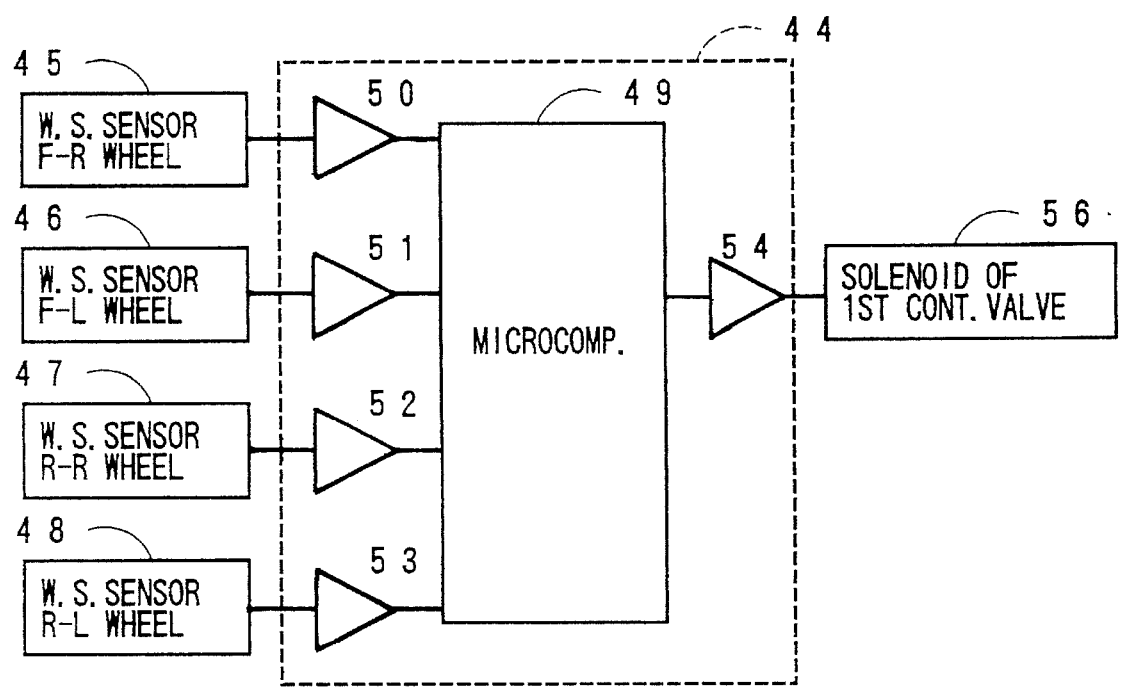
FIG. 2 is a block diagram of an electronic control circuit in the first embodiment of the present invention.
Figure 3:
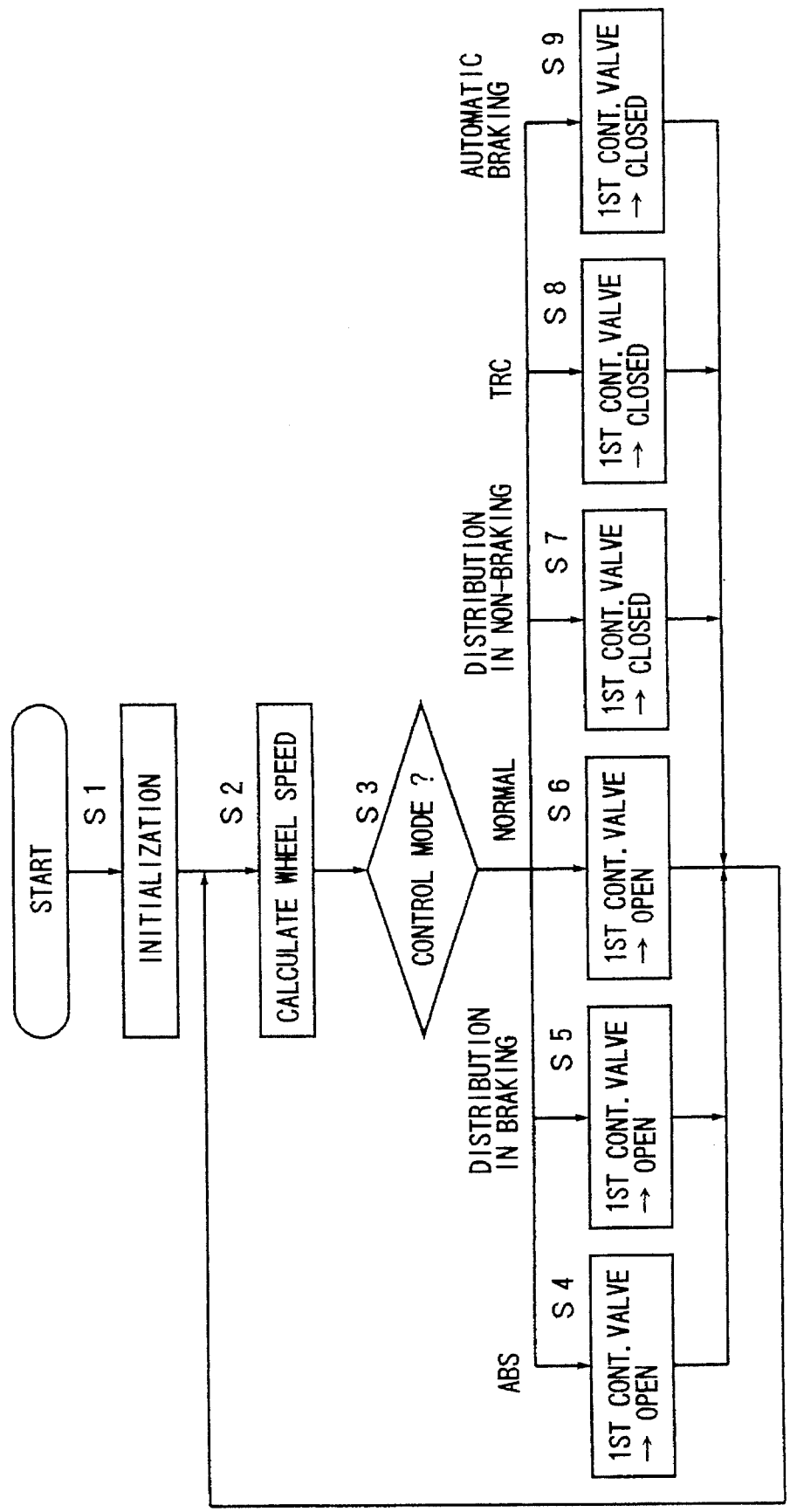
FIG. 3 is a flowchart executed in the first embodiment of the present invention.

As shown in FIG. 2, the electronic control circuit 44 is provided with a microcomputer 49 to which outputs of the wheel speed sensors 45 to 48 are fed through input interfaces 50 to 53. The solenoid 56 of the first control valve 24 is connected to an output terminal of the microcomputer 49 through an output interface 54. The microcomputer 49 operates in accordance with a flow chart as shown in FIG. 3. When the microcomputer 49 begins to operate, an initialization is executed at Step S1 to initialize verious memories, input and output signals, or the like. Then, input operations are executed at Step S2, where a wheel speed of each wheel is calculated on the basis of the outputs of the wheel speed sensors 45 to 48, for example. Then, a control mode is selected at Step S3 to proceed in accordance with the selected control mode. The microcomputer 49 provides a normal braking mode, an anti-lock braking control (ABS) mode, a braking force distribution control mode in braking operation, a braking force distribution control mode in non-braking operation, a traction control (TRC) mode, and an automatic braking mode. The anti-lock braking control mode is provided for preventing the wheel under control from locking, and selected in accordance with a slipping condition of the wheel during deceleration of the vehicle. For instance, if a difference between the wheel speed and a vehicle speed exceeds a predetermined range, the anti-lock braking control mode will be selected. The vehicle speed may be estimated on the basis of the average or maximum of the wheel speeds of all the wheels, or directly detected by a vehicle speed sensor which is provided additionally.

The braking force distribution control is provided for controlling the braking force of the right or left wheel to increase a cornering performance of the vehicle, or preventing a spin of the vehicle. The braking force distribution control mode in braking operation will be selected when a yaw rate of the vehicle becomes large during the braking operation of the vehicle, whereas the braking force distribution control mode in non-braking operation will be selected, when a cornering amount of the vehicle becomes large during the non-braking operation of the vehicle. The cornering amount of the vehicle may be detected by a yaw rate sensor, or may be calculated from a steering amount of the vehicle. The traction control mode is provided for preventing the slip of the wheel during the acceleration of the vehicle, and selected when the difference between the wheel speed of the driven wheel and the vehicle speed exceeds a predetermined range. The automatic braking mode is provided for braking the vehicle without direct operation of a driver, and selected in the case where an obstacle is detected in front of the vehicle, or the case where the driver has dozed, or the like cases. The obstacle may be detected by an obstacle detection sensor such as a radar. The driver's doze may be detected by a heart beat sensor for detecting a heart beat of the driver, or a brain wave sensor for detecting a brain wave of the driver, or a camera for detecting the number of blink or watching a motion of the pupil of the driver's eye. The automatic braking mode may be selected, when the driver has performed a predetermined operation, e.g. the vehicle may be automatically braked when the driver's eye has been blinked three times consecutively, or when the driver's voice or motion of his mouth speaking "brake" has been detected. When none of the above-described modes is selected, the normal mode will be selected.

With either one of the modes selected, the first control valve 24 is controlled in accordance with the selected mode at Steps S4 to S9. If one of the anti-lock braking control mode, the braking force distribution control mode in braking operation, and the normal mode is selected, the solenoid 56 will be operated to open the first control valve 24. On the contrary, if one of the braking force distribution control mode in non-braking operation, the traction control mode, and the automatic braking mode is selected, the solenoid 56 will be operated to close the first control valve 24. Thereafter, the above-described routine starting from Step S2 will be repeated.

According to the above-described embodiment, when the electronic control circuit 44 selects the mode for opening the first control valve 24, the first port 16 of the master cylinder 10 communicates with the reservoir 20. In this condition, the first pressure chamber 11 and the second pressure chamber 12 are filled with the brake fluid supplied from the reservoir 20. When the brake pedal 13 is depressed, the communication between the first port 16 and the first pressure chamber 11 of the master cylinder 10 is blocked by the first piston 14, and the communication between the third port 18 and the second pressure chamber 12 is blocked by the second piston 15. Therefore, the pressure in the first pressure chamber 11 and that in the second pressure chamber 12 are increased in response to depression of the brake pedal 13, respectively. Since the pressure control devices 30, 31 communicate with the first pressure chamber 11 through the passage 28 and the second port 17, if the pressure in the first pressure chamber 11 is supplied to the wheel cylinders 38, 39, the braking force will be applied to the wheels 58, 59. If the pressure in the first pressure chamber 11 is controlled by the pressure control devices 30, 31 to supply the wheel cylinders 38, 39, therefore, the braking force may be controlled. In the normal mode, the pressure control devices 30, 31 communicate the passage 28 with the passages 34, 35 to communicate the first pressure chamber 11 with the wheel cylinders 38, 39. Consequently, the braking force which is proportional to the depressed amount of the brake pedal 13, is applied to provide the normal braking mode. In the anti-lock braking control mode, the pressure in the wheel cylinder of the wheel which is likely to be locked, is decreased to prevent the wheel from being locked. According to the braking force distribution control mode in braking operation, the braking force applied to the right and left wheel is controlled to change the cornering performance of the vehicle. The pressure control devices 32, 33 communicate with the second pressure chamber 12 through the fourth port 19. Therefore, if the pressure in the second pressure chamber 12 is supplied to the wheel cylinders 40, 41, the braking force will be applied to the wheels 60, 61. Then, if the pressure in the second pressure chamber 12 is controlled by the pressure control devices 32, 33 to supply the wheel cylinders 40, 41, the braking force may be controlled.

When the electronic control circuit 44 selects the mode for closing the first control valve 24, the communication between the first port 16 of the master cylinder 10 and the reservoir 20 is blocked. In this condition, when the pump 27 is driven to rotate, the brake fluid is supplied from the reservoir 20 to the first pressure chamber 11 through the passage 28 and the second port 17. As the communication between the first pressure chamber 11 and the reservoir 20 has been blocked, the pressure in the passage 28 and the first pressure chamber 11 including the second port 17 is increased. Since the pressure control devices 30, 31 communicate with the first pressure chamber 11 through the passage 28, if the pressure in the first pressure chamber 11 is supplied to the wheel cylinders 38, 39, the braking force will be applied to the wheels 58, 59. Then, if the pressure in the first pressure chamber 11 is controlled by the pressure control devices 30, 31 to supply the wheel cylinders 38, 39, the braking force may be controlled. In the braking force distribution control mode in non-braking operation, the braking force applied to the right and left wheel is controlled to change the cornering performance of the vehicle. In the traction control mode, the pressure in the wheel cylinder of the wheel which is likely to slip during acceleration, is increased to prevent the wheel from slipping. In the case where the wheels 58, 59 are non-driven wheels, however, the communication between the passage 28 and the passages 34, 35 is blocked not to supply the pressure to the wheel cylinders 38, 39. In the automatic braking mode, the pressures in the wheel cylinders 38, 39 are controlled to apply necessary baking forces to the wheels 58, 59.

Further, with the pressure in the first pressure chamber 11 increased, the second piston 15 moves to block the communication between the second pressure chamber 12 and the reservoir 20, to increase the pressure in the second pressure chamber 12. The pressure control devices 32, 33 communicate with the second pressure chamber 12 through the fourth port 19. Therefore, if the pressure in the second pressure chamber 12 is supplied to the wheel cylinders 40, 41, the braking force will be applied to the wheels 60, 61. Then, if the pressure in the second pressure chamber 12 is controlled by the pressure control devices 32, 33 to supply the wheel cylinders 40, 41, the braking force may be controlled. In the braking force distribution control mode in non-braking operation, the braking force applied to the right and left wheel is controlled to change the cornering performance of the vehicle. In the traction control mode, the pressure in the wheel cylinder of the wheel which is likely to slip during acceleration, is increased to prevent the wheel from slipping. In the case where the wheels 60, 61 are non-driven wheels, however, the communication between the passage 29 and the passages 36, 37 is blocked not to supply the pressure to the wheel cylinders 40, 41. In the automatic braking mode, the pressures in the wheel cylinders 40, 41 are controlled to apply necessary baking forces to the wheels 60, 61.

Accordingly, the normal braking, the anti-lock braking control, the braking force distribution control, the traction control and the automatic braking control may be performed. Although a plurality of control modes were provided in the above-described first embodiment, some of the control modes may be employed in practice.

Figure 4:
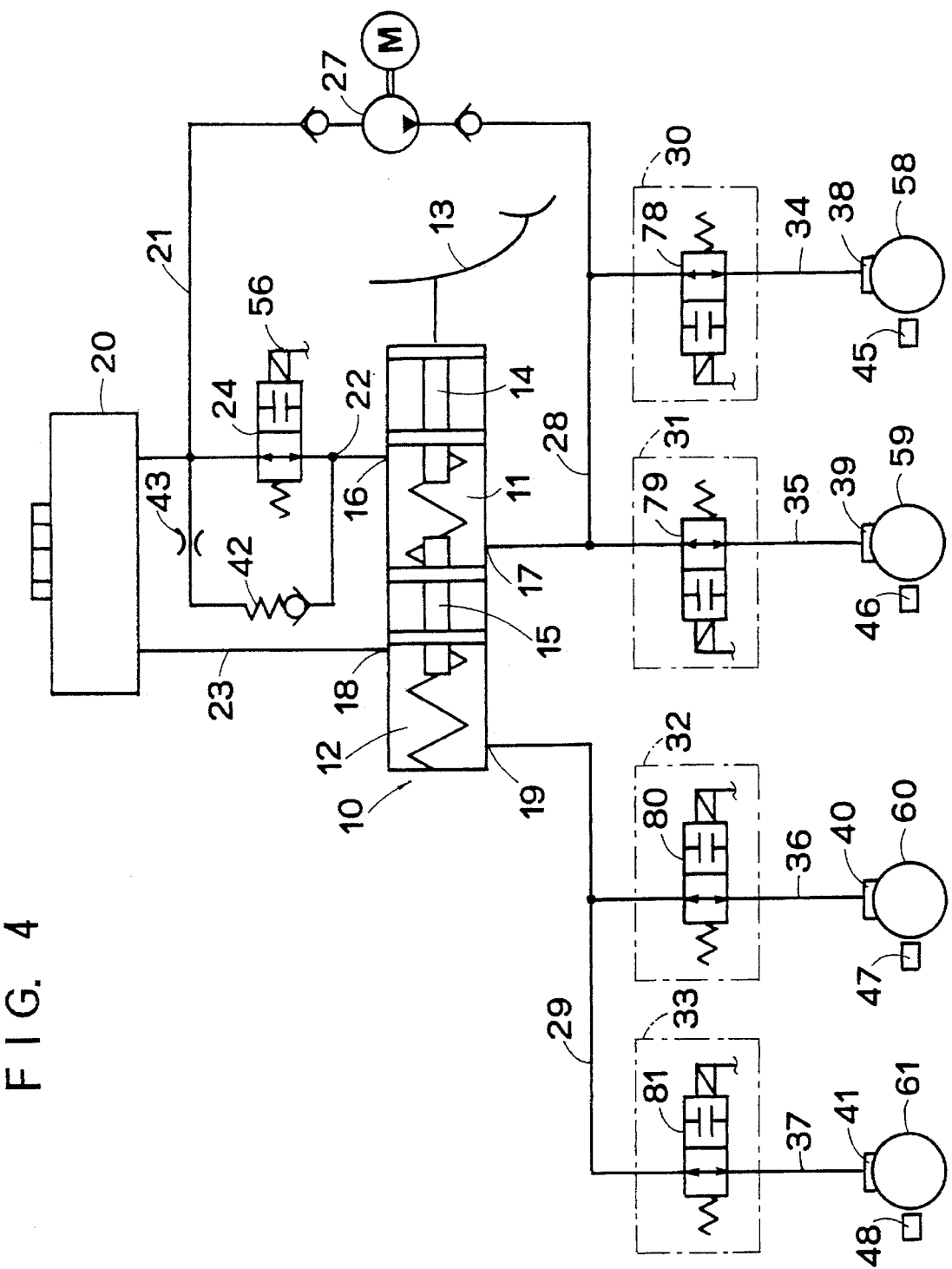
FIG. 4 is a schematic illustration of a second embodiment of a hydraulic braking system according to the present invention.

FIG. 4 illustrates a second embodiment of the present invention, wherein a relief valve 42 and an orifice 43 have been added to the first embodiment, and wherein the pressure control devices 30 to 33 include switching (open/close) valves 78 to 81, respectively. The relief valve 42 and the orifice 43 are provided between the passages 21 and 22. The relief valve 42 is arranged to open when the pressure in the passage 22 exceeds the pressure in the passage 21 by more than a predetermined pressure. The orifice 43 provides a pressure difference between the relief valve 42 and the passage 21 to prevent the pressure from decreasing abruptly and causing bubbles in the brake fluid, when the relief valve 42 opens. The switching valves 78 to 81 are controlled to be opened or closed, respectively, such that they are closed to hold the pressure in the wheel cylinders just before the wheels slip, in the anti-lock braking control mode. In the case where the pressures in the wheel cylinders are to be decreased in the braking force distribution control mode in non-braking, the traction control mode, and the automatic braking mode, one of the switching valves 78 to 81 which is operatively mounted on a wheel cylinder, the pressure in which is to be decreased, will be opened, while the rest of the switching valves 78 to 81 will be closed and the first control valve 24 will be opened.

Figure 5:
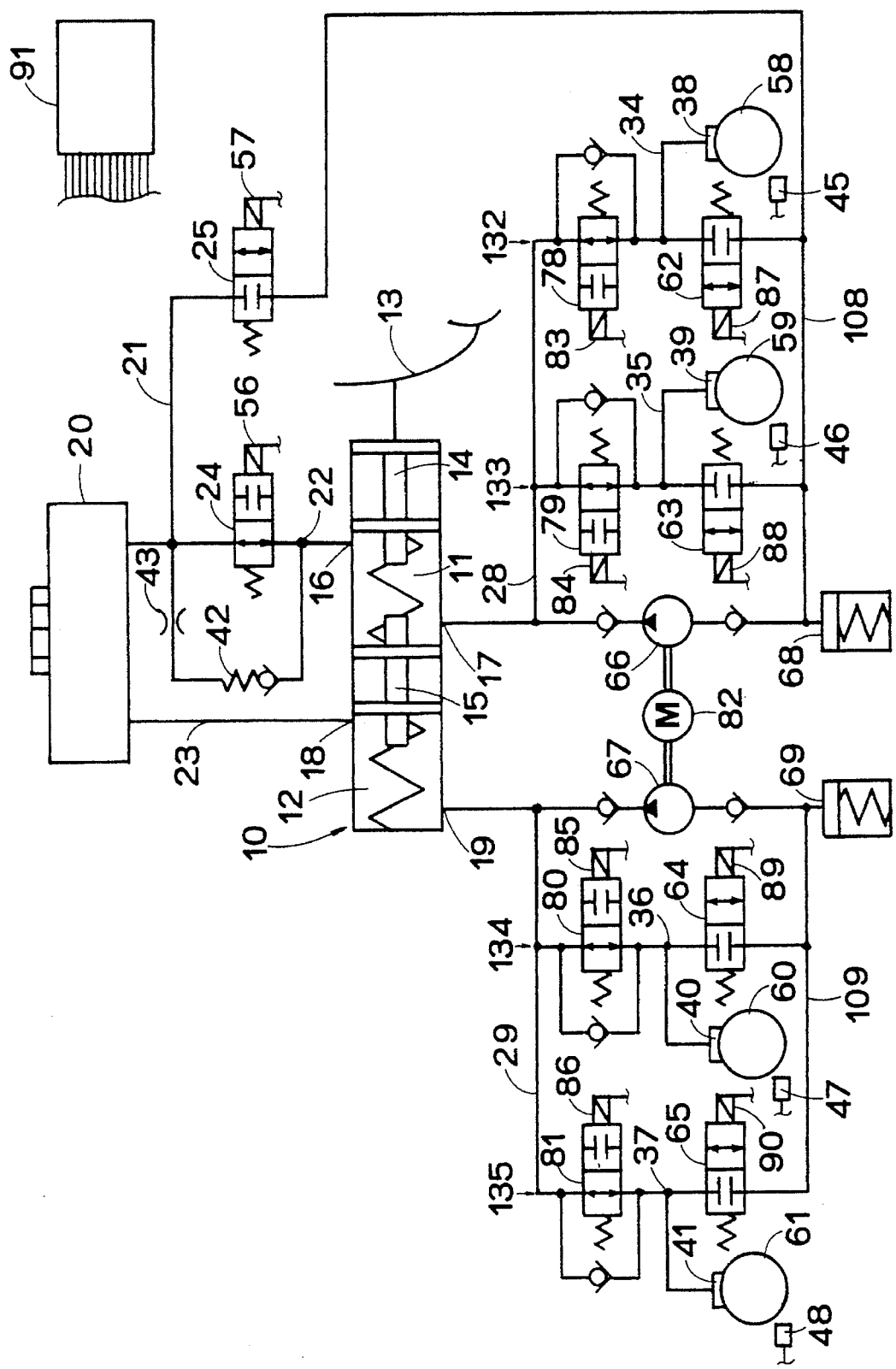
FIG. 5 is a schematic illustration of a third embodiment of a hydraulic braking system according to the present invention.

FIG. 5 illustrates the third embodiment of the present invention. According to this embodiment, anti-lock braking control devices 132 to 135 are provided in lieu of the pressure control devices as described in FIG. 1. A first pump 66 is provided commonly for both the anti-lock braking control devices 132 and 133, and a second pump 67 is provided commonly for both the anti-lock braking control devices 134 and 135. A second control valve 25 of a switching valve is provided between the reservoir 20 and the anti-lock braking control devices 132, 133. An electronic control circuit 91 is provided for controlling the solenoids 56, 57 of the first control valve 24 and the second control valve 25, and also controlling the anti-lock braking control devices 132 to 135. The anti-lock braking control devices 132, 133 include switching valves 78, 79 of a two-port and two-position inlet valve, and switching valves 62, 63 of a two-port two-position outlet valve, which valves are actuated by the respective solenoids 83, 84, 87, 88 which are energized (ON) or de-energized (OFF) by the electronic control circuit 91. Thus, the electronic control circuit 91 serves as a valve controller in the present invention. The switching valves 78, 79 are opened when the solenoids 83, 84 are de-energized, while the switching valves 62, 63 are closed when the solenoids 87, 88 are de-energized, as shown in FIG. 5. The input ports of the switching valves 78, 79 are connected to the second port 17 of the master cylinder 10 through the passage 28, while their output ports are connected to the wheel cylinders 38, 39, respectively. The input ports of the switching valves 62, 63 are connected to the wheel cylinders 38, 39, while their output ports are connected to a first auxiliary reservoir 68 and the input port of the first pump 66, which is driven by a motor 82, through a first drain passage 108.

The anti-lock braking control devices 134, 135 include switching valves 80, 81 and solenoids 85, 86 thereof, switching valves 64, 65 and solenoids 89, 90 thereof, the wheel cylinders 40, 41, a second auxiliary reservoir 69 and a second pump 67, which are constituted in the same manner as the above-described devices. The input ports of the switching valves 80, 81 are connected to the fourth port 19 of the master cylinder 10 through the passage 29, while their output ports are connected to the wheel cylinders 40, 41. The input ports of the switching valves 64, 65 are connected to the wheel cylinders 40, 41, while their output ports are connected to the second reservoir 69 and the input port of the second pump 67, which is driven by the motor 82, through a second drain passage 109. Each of the solenoids 56, 57 and 83 to 90 is arranged to be held at a predetermined position by a spring (not shown), when it is de-energized.

That is, when those solenoids are de-energized (OFF), the first control valve 24 and the switching valves 78 to 81 are opened, while the second control valve 25 and the switching valves 62 to 65 are closed.

Figure 6:
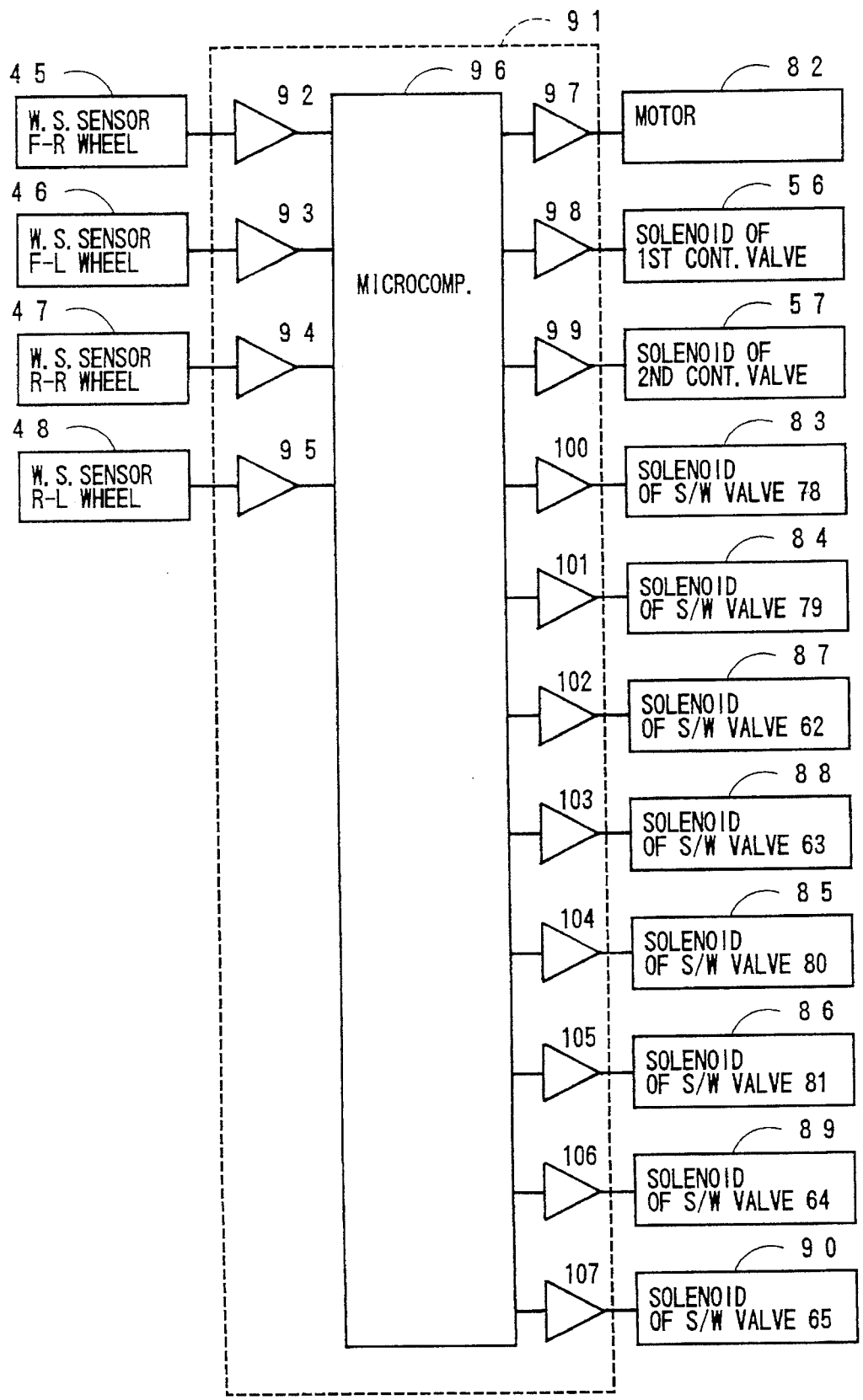
FIG. 6 is a block diagram of an electronic control circuit in the third embodiment of the present invention.
Figure 7:
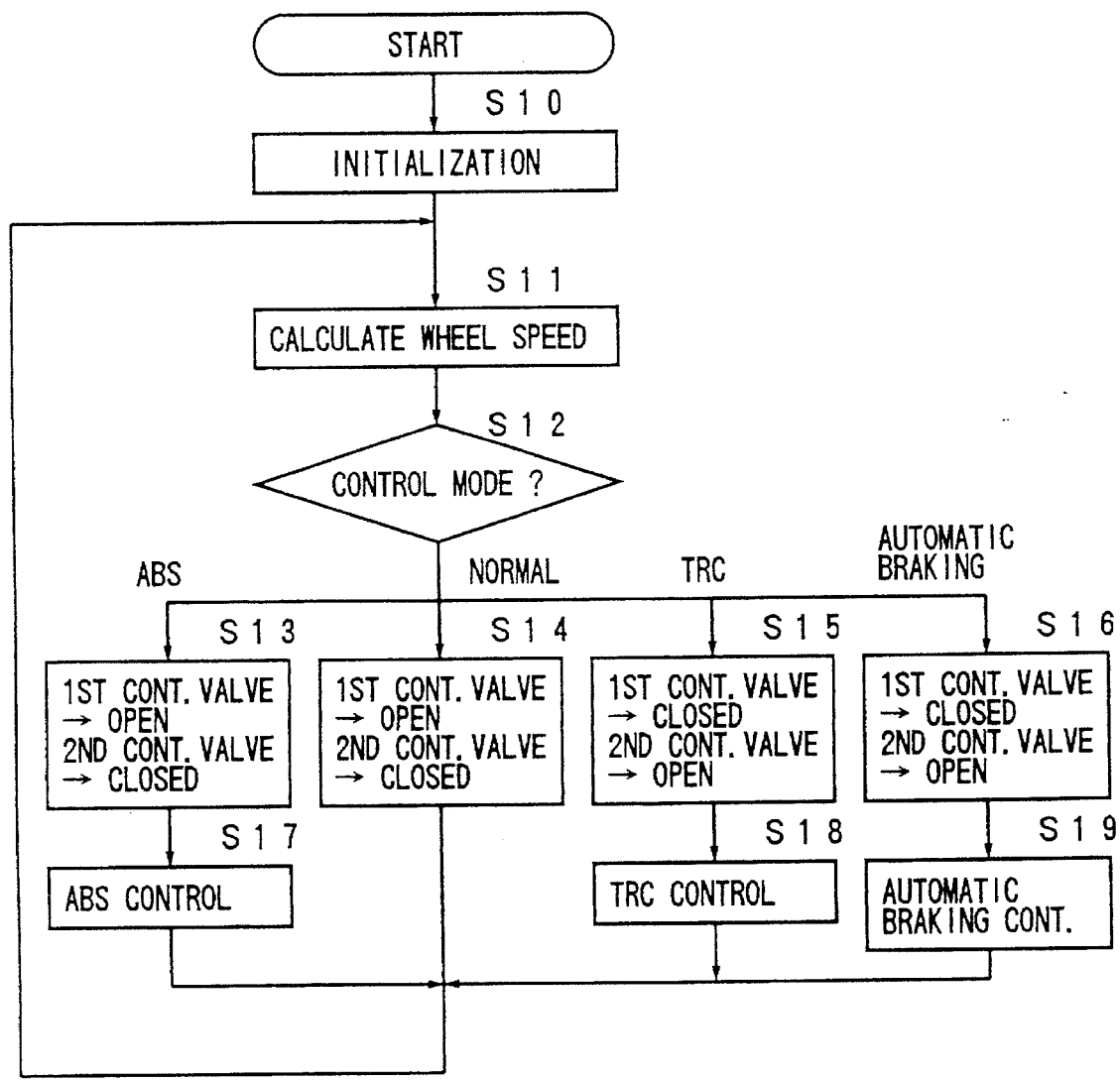
FIG. 7 is a flowchart executed in the third embodiment of the present invention.

FIG. 6 illustrates the electronic control circuit 91 of the third embodiment which includes a microcomputer 96. The output signals of the wheel speed sensors 45 to 48 are fed to the microcomputer 96 through input interfaces 92 to 95, and a control signal is output to the motor 82 through an output interface 97, and control signals are output to the solenoids through output interfaces 98 to 107. The microcomputer 96 operates in accordance with a flowchart as shown in FIG. 7. When the microcomputer 96 begins to operate, an initialization is executed at Step S10, and a wheel speed of each wheel is calculated on the basis of the outputs of the wheel speed sensors 45 to 48 at Step S11. Then, a control mode is selected on the basis of the wheel speed, slip rate and the like at Step S12, out of the normal braking mode, the anti-lock braking control mode, the traction control mode, and the automatic braking mode, which will be described in detail hereinafter.

(1) When the normal braking mode is selected at Step S12, all the solenoids are turned off, or de-energized at Step S14. Therefore, the first port 16 communicates with the reservoir 20, the first pressure chamber 11 communicates with the wheel cylinders 38, 39, and the second pressure chamber 12 communicates with the wheel cylinders 40, 41, respectively. When the brake pedal 13 is depressed in this condition, the pressure in the first pressure chamber 11 is supplied to the wheel cylinders 38, 39, and the pressure in the second pressure chamber 12 is supplied to the wheel cylinders 40, 41, to brake the respective wheels.

(2) When the anti-lock braking control mode is selected at Step S12, the solenoids 56, 57 are de-energized at Step S13. Then, the anti-lock braking control is performed at Step S17, where the pressure in each wheel cylinder is increased, held or decreased in dependence upon the locking condition of each wheel so as to control the braking force applied to each wheel and adjust the slip condition between the wheel and road surface. When the pressure in a wheel cylinder is to be decreased, a pair of solenoids out of the solenoids 83 to 90, which actuate the switching valves to control the pressure in the wheel cylinder to be decreased, are energized to drain the brake fluid from one of the wheel cylinders to be decreased, to the first reservoir 68 or the second reservoir 69 through the first drain passage 108 or the second drain passage 109, respectively. When the pressure in a wheel cylinder is to be held, one of the solenoids 83 to 86, which actuates one of the switching valves 78 to 81 to control the pressure in the wheel cylinder to be held, is energized, and one of the solenoids 87 to 90, which actuates one of the switching valves 62 to 65 to control the pressure in the wheel cylinder to be held, is de-energized, to shut off the wheel cylinder to be held. When the pressure in a wheel cylinder is to be increased, a pair of solenoids out of the solenoids 83 to 90, which actuate the switching valves to control the pressure in the wheel cylinder to be increased, are de-energized to supply the pressure in the first pressure chamber 11 or the second pressure chamber 12 to the wheel cylinder to be increased. The brake fluid stored in the first and second reservoirs 68, 69 is fed back to the first and second pressure chambers 11, 12, respectively, with the first and second pumps 66, 67 driven.

(3) When the traction control mode is selected at Step S12, the solenoids 56, 57 are energized to close the first control valve 24 and open the second control valve 25 at Step S15. In this condition, when the first pump 66 is driven, the brake fluid is supplied from the reservoir 20 to the first pressure chamber 11 to increase the pressure therein. With the pressure increased, the second piston 15 is moved to close the third port 18, thereby to increase the pressure in the second pressure chamber 12. Then, at Step S18, the pressure in the wheel cylinder of the wheel in slipping is increased, held or decreased to apply an appropriate braking force to the wheel in slipping. When the pressure in a wheel cylinder is to be increased, a pair of solenoids out of the solenoids 83 to 90, which actuate the switching valves to control the pressure in the wheel cylinder to be increased, are de-energized to supply the brake fluid from the first pressure chamber 11 or the second pressure chamber 12 to one of the wheel cylinders to be increased. In this case, the solenoids 83 to 86 of the wheel cylinders other than the wheel cylinder to be increased (i.e., those of non-driven wheels or non-slipping wheels) are energized to prevent the pressure from being supplied to those wheel cylinders. When the pressure is to be held, one of the solenoids 83 to 86 is energized, and one of the solenoids 87 to 90 is de-energized, to shut off the wheel cylinder to be held. When the pressure in a wheel cylinder is to be decreased, a pair of solenoids out of the solenoids 83 to 90, which actuate the switching valves to control the pressure in the wheel cylinder to be decreased, are energized to close one of the switching valves 78 to 81 and open one of the switching valves 62 to 65. Therefore, the brake fluid in one of the wheel cylinders 38, 39 is sucked by the first pump 66, or discharged to the reservoir 20 or the first reservoir 68, while the brake fluid in the wheel cylinders 40, 41 is sucked by the second pump 67, or discharged to the second reservoir 69. Consequently, the pressure in each of the wheel cylinders 38 to 41 will be decreased to reduce the braking force applied to the respective wheel.

(4) When the automatic braking mode is selected at Step S12, the solenoids 56, 57 are energized to close the first control valve 24 and open the second control valve 25 at Step S16. In this condition, when the first pump 66 is driven, the brake fluid is supplied from the reservoir 20 to the first pressure chamber 11 to increase the pressure therein. With the pressure increased, the second piston 15 is moved to close the third port 18, thereby to increase the pressure in the second pressure chamber 12. Then, at Step S19, the solenoids 83 to 90 are de-energized, so that the switching valves 78 to 81 are opened, while the switching valves 62 to 65 are closed. Therefore, the pressure in the first pressure chamber 11 is applied to the wheel cylinders 38, 39, and the pressure in the second pressure chamber 12 is supplied to the wheel cylinders 40, 41, so that the pressure in each of the wheel cylinders 38 to 41 is increased to apply the braking force to the respective wheel. In order to control the braking force, the switching valves 78 to 81 and 62 to 65 may be actuated in the same manner as the traction control mode, or the amount of brake fluid discharged from the first and second pumps 66, 67 may be controlled as desired.

After either one of the modes is performed, one of the above modes is selected at Step S12 again, and the above-described routine will be repeated. Although the braking force distribution control in braking and that in non-braking are omitted in the third embodiment, they may be provided in this embodiment as in the first embodiment. As described above, the relief valve 42 is provided in the third embodiment so as to prevent an extremely high pressure from being exerted in the closed circuit including the output ports of the first and second pumps 66, 67, the first control valve 24, and the switching valves 78 to 81. To perform the same function as in the above, the first and second pumps 66, 67 may be stopped, or the relief valve may be provided between the output port and the input port of each of the first and second pumps 66, 67. In lieu of the first pump 66 which is required to suck the brake fluid from the reservoir 20, a self-supplying pump, to which the brake fluid is easily sucked, may be employed. However, a low cost pump may be employed as the second pump 67, because this pump is not necessarily required to suck the brake fluid so easily.

Figure 8:
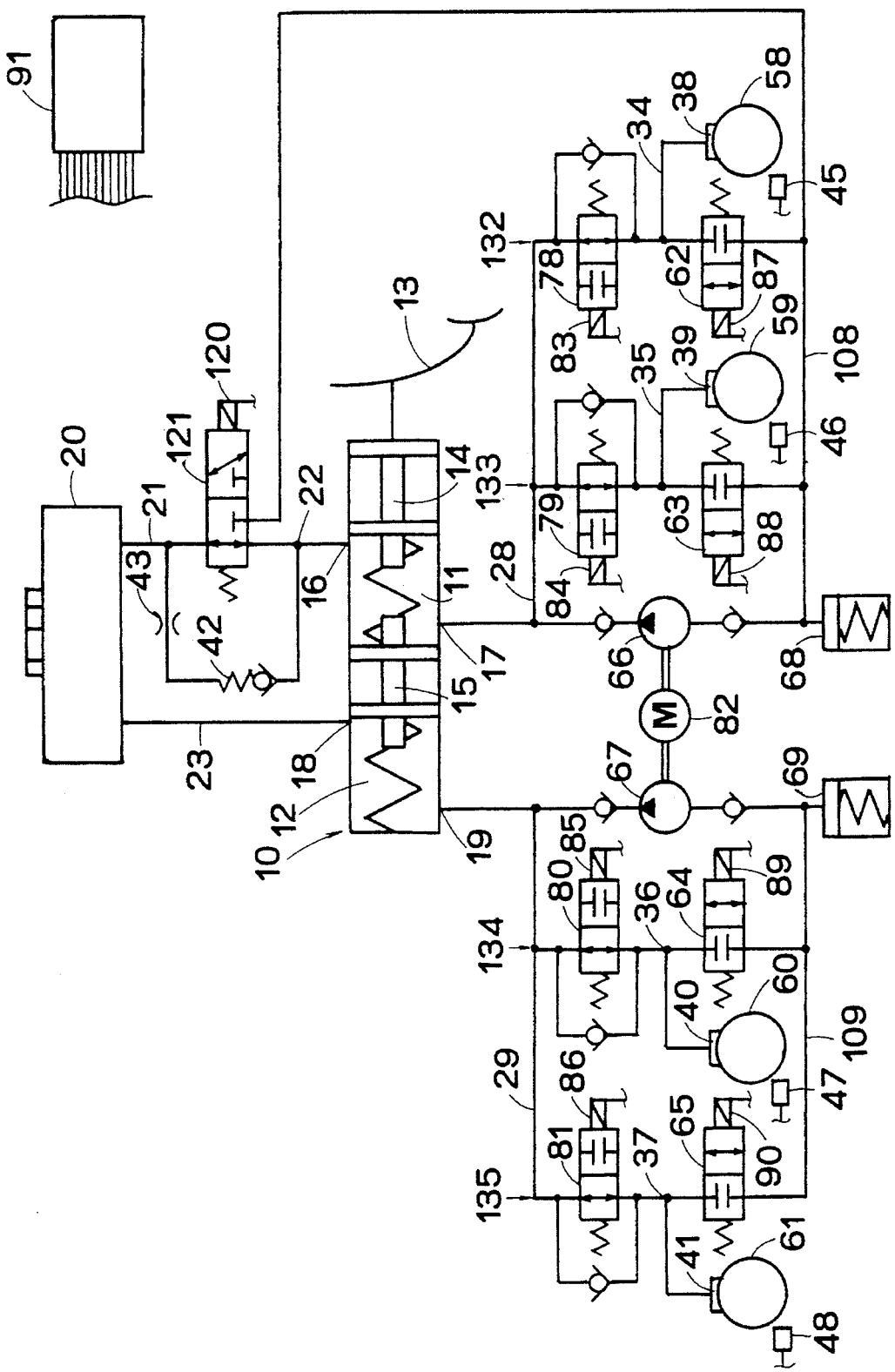
FIG. 8 is a schematic illustration of a fourth embodiment of a hydraulic braking system according to the present invention.

FIG. 8 illustrates a fourth embodiment of the present invention, wherein a three-port two-position changeover valve 121, which is actuated by a solenoid 120, is employed in lieu of the first and second control valves 24, 25 in the third embodiment. According to the fourth embodiment, the single changeover valve 121 functions as both the first and second control valves 24, 25 do, so that the number of switching valves is reduced by one valve comparing with the third embodiment, and the number of solenoids is reduced, as well.

Figure 9:
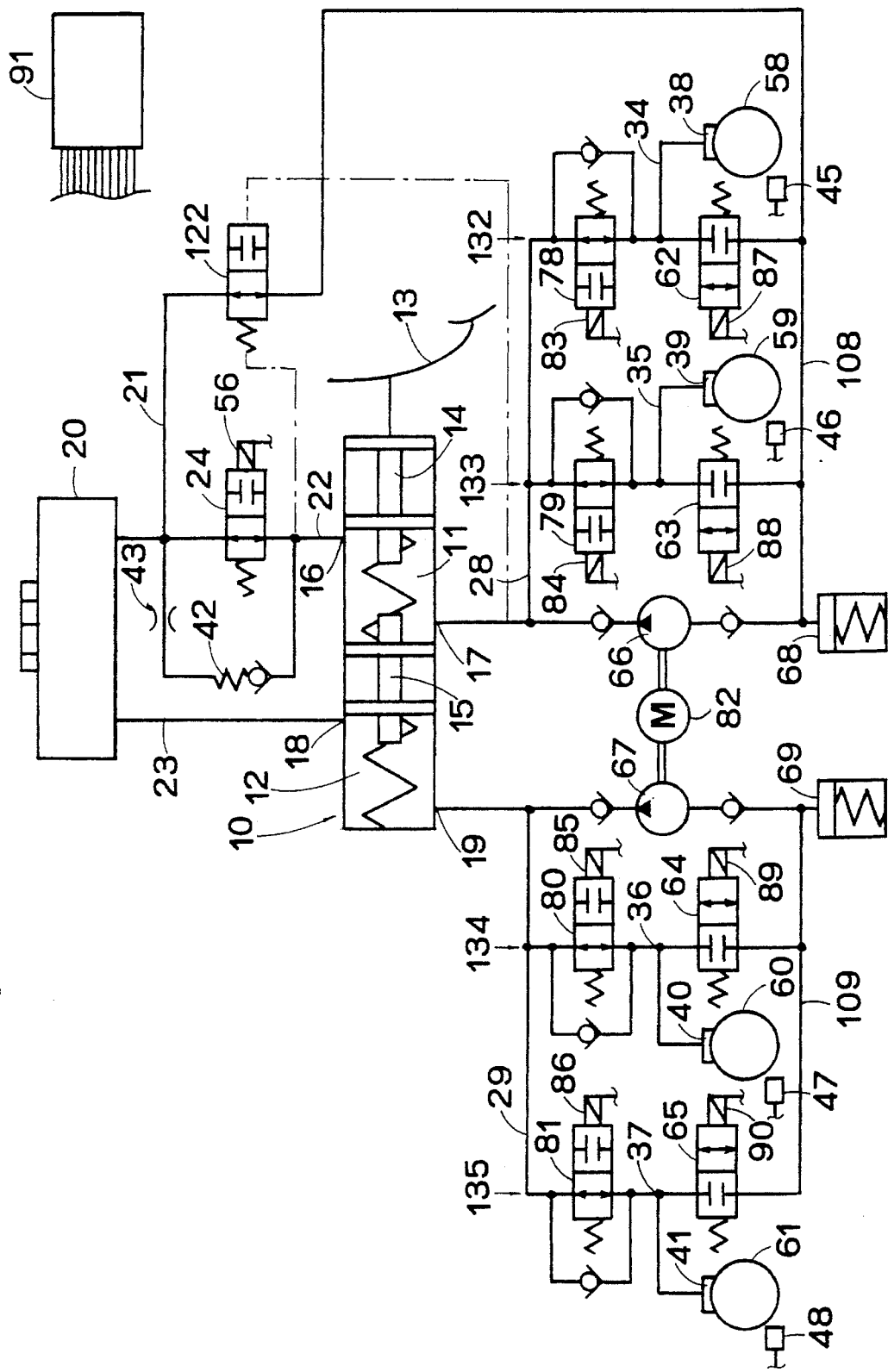
FIG. 9 is a schematic illustration of a fifth embodiment of a hydraulic braking system according to the present invention.

FIG. 9 illustrates the fifth embodiment of the present invention, wherein a pressure responsive switching valve 122, which is opened or closed in response to a pressure difference between the first port 16 and the second port 17 of the master cylinder 10, is employed in lieu of the solenoid operated second control valve 25. When the brake pedal 13 is not depressed, the input port of the first pump 66 communicates with the reservoir 20. According to the fifth embodiment, when the brake pedal 13 is depressed, the pressure responsive switching valve 122 is changed over. Since one solenoid is omitted in this embodiment comparing with the third embodiment, the consumption of electricity is reduced and the cost is lowered. The traction control and the automatic braking control is effectuated, only when the brake pedal 13 is not depressed.

Figure 16:
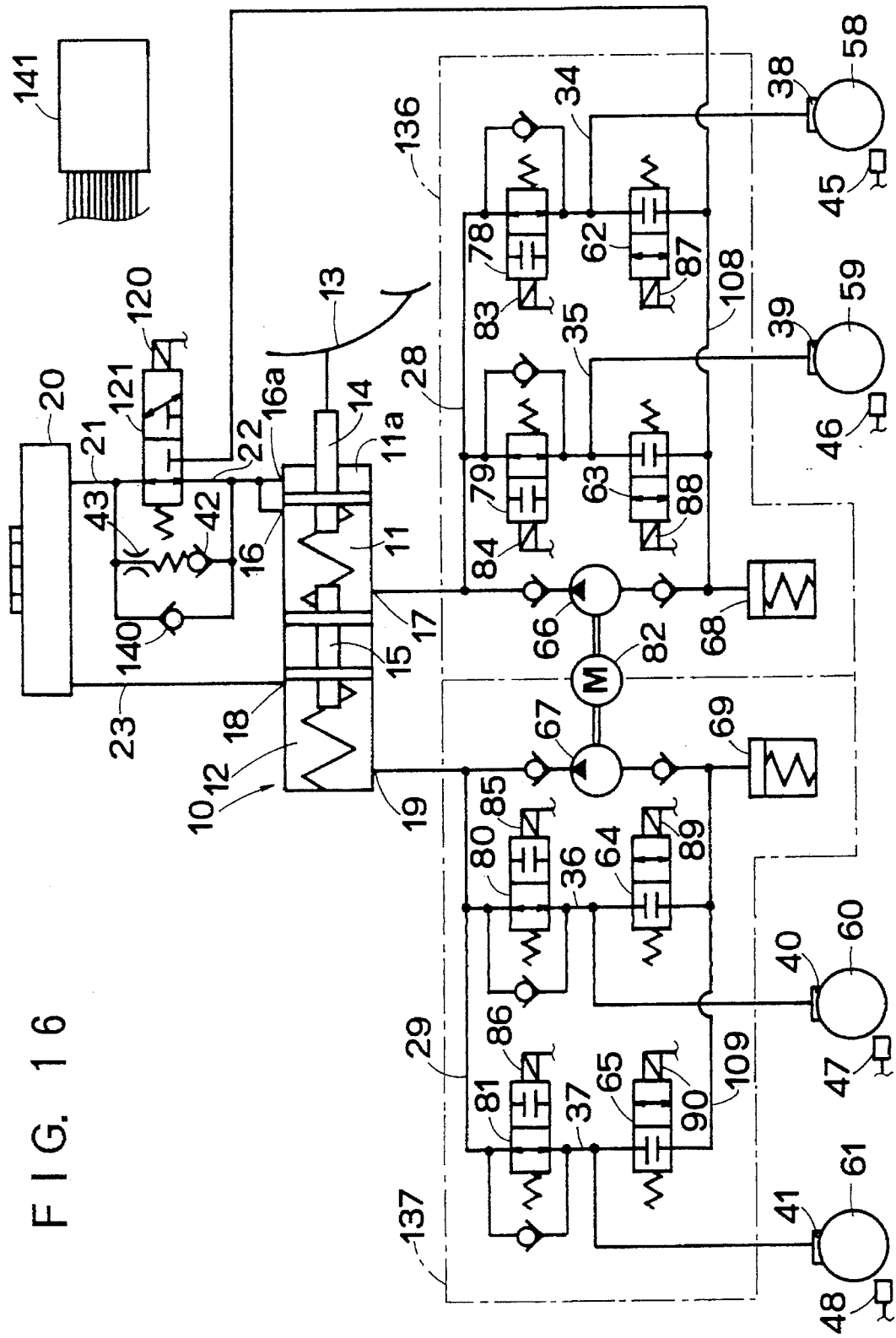
FIG. 16 is a schematic illustration of a sixth embodiment of a hydraulic braking system according to the present invention.

FIGS. 16 to 18 relate to a sixth embodiment of the present invention. The hydraulic braking system in this embodiment has a first pressure control circuit 136 which includes the same anti-lock braking control devices as the devices 132 and 133 of the third to fifth embodiments as shown in FIGS. 5, 8 and 9 respectively, and a second pressure control circuit 137 which includes the same anti-lock braking control devices as the devices 134 and 135 of the third to fifth embodiments. Comparing with the previously described embodiments, the tandem master cylinder 10 in the sixth embodiment is further provided with a reservoir chamber 11a which is defined by the first piston 14 at its side connected to the brake pedal 13, and a fifth port 16a which communicates with the reservoir chamber 11a. The first pressure chamber 11 is defined between the first piston 14 and the second piston 15, while the second pressure chamber 12 is defined by the second piston 15 at its side opposite to the brake pedal 13. The changeover valve 121, relief valve 42 and orifice 43 are provided between the reservoir 20 and the master cylinder 10 in the present embodiment, as in the fourth embodiment in FIG. 8. However, the changeover valve 121 in this embodiment is connected to both the first port 16 and the fifth port 16a of the master cylinder 10. In parallel with the changeover valve 121, the relief valve 42 (with the orifice 43) is provided, and a one way valve 140, which allows the brake fluid to flow from the passage 21 to the passage 22 and prevents the reserve flow, is provided as shown in FIG. 16. The changeover valve 121 is changed over so as to select a first position where the passages 21 communicates with the passage 22, or a second position where the passage 21 communicates with the passage 108. The changeover valve 121 is biased by a spring to select the first position when the solenoid 120 is de-energized (OFF), and changed over to select the second position when the solenoid 120 is energized (ON).

FIG. 17 illustrates an electronic control circuit 141 which is substantially the same as that in FIG. 6, expect that the solenoid 120 of the changeover valve 121 and its output interface 142 are provided in FIG. 17, in lieu of the solenoids 56, 57 and their output interfaces 98, 99 in FIG. 6. The microcomputer 96 operates in accordance with a flowchart as shown in FIG. 18. When the microcomputer 96 begins to operate, an initialization is executed at Step S20, and a wheel speed of each wheel is calculated on the basis of the outputs of the wheel speed sensors 45 to 48 at Step S21. Then, a control mode is selected on the basis of the wheel speed, slip rate and the like at Step S22, out of the normal braking mode, the anti-lock braking control mode (ABS), the traction control mode (TRC), the braking force distribution control mode in braking, the braking force distribution control mode in non-braking, and the automatic braking mode, which will be described in detail hereinafter.

When the normal braking mode is selected at Step S22, the solenoid 120 of the changeover valve 121 is de-energized (OFF) at Step S27, and other solenoids are de-energized at Step 28. Therefore, the first port 16 communicates with the reservoir 20, the first pressure chamber 11 communicates with the wheel cylinders 38, 39, and the second pressure chamber 12 communicates with the wheel cylinders 40, 41, respectively. When the brake pedal 13 is depressed in this condition, the pressure in the first pressure chamber 11 is supplied to the wheel cylinders 38, 39, and the pressure in the second pressure chamber 12 is supplied to the wheel cylinders 40, 41, to brake the respective wheels.

When the anti-lock braking control mode is selected at Step S22, the solenoid 120 of the changeover 121 is de-energized (OFF) at Step S23. Then, the anti-lock braking control (ABS) is performed at Step S24, where the pressure in each wheel cylinder is increased, held or decreased in dependence upon the locking condition of each wheel so as to control the braking force applied to each wheel and adjust the slip condition between the wheel and road surface. When the pressure in a wheel cylinder is to be decreased, a pair of solenoids out of the solenoids 83 to 90, which actuate the switching valves to control the pressure in the wheel cylinder to be decreased, are energized to drain the brake fluid from one of the wheel cylinders to be decreased, to the first reservoir 68 or the second reservoir 69 through the first drain passage 108 or the second drain passage 109, respectively. When the pressure in a wheel cylinder is to be held, one of the solenoids 83 to 86, which actuates one of the switching valves 78 to 81 to control the pressure in the wheel cylinder to be held, is energized, and one of the solenoids 87 to 90, which actuates one of the switching valves 62 to 65 to control the pressure in the wheel cylinder to be held, is de-energized, to shut off the wheel cylinder to be held. When the pressure in a wheel cylinder is to be increased, a pair of solenoids out of the solenoids 83 to 90, which actuate the switching valves to control the pressure in the wheel cylinder to be increased, are de-energized to supply the pressure in the first pressure chamber 11 or the second pressure chamber 12 to the wheel cylinder to be increased. The brake fluid stored in the first and second reservoirs 68, 69 is fed back to the first and second pressure chambers 11, 12, respectively, with the first and second pumps 66, 67 driven.

When the traction control mode is selected at Step S22, the solenoid 120 is energized (ON) at Step S31, and the first pump 66 is driven at Step S32 to supply brake fluid from the reservoir 20 to the first pressure chamber 11, whereby the pressure therein is increased. With the pressure increased, the second piston 15 is moved to close the third port 18, thereby to increase the pressure in the second pressure chamber 12. Then, the pressure in the wheel cylinder of the wheel in slipping is increased, held or decreased to apply an appropriate braking force to the wheel in slipping. When the pressure in a wheel cylinder is to be increased, a pair of solenoids out of the solenoids 83 to 90, which actuate the switching valves to control the pressure in the wheel cylinder to be increased, are de-energized to supply the brake fluid from the first pressure chamber 11 or the second pressure chamber 12 to one of the wheel cylinders to be increased. In this case, the solenoids 83 to 86 of the wheel cylinders other than the wheel cylinder to be increased (i.e., those of non-driven wheels or non-slipping wheels) are energized to prevent the pressure from being supplied to those wheel cylinders. When the pressure is to be held, one of the solenoids 83 to 86 is energized, and one of the solenoids 87 to 90 is de-energized, to shut off the wheel cylinder to be held. When the pressure in a wheel cylinder is to be decreased, a pair of solenoids out of the solenoids 83 to 90, which actuate the switching valves to control the pressure in the wheel cylinder to be decreased, are energized to close one of the switching valves 78 to 81 and open one of the switching valves 62 to 65. Therefore, the brake fluid in one of the wheel cylinders 38, 39 is sucked by the first pump 66, or discharged to the reservoir 20 or the first reservoir 68, and the brake fluid in the wheel cylinders 40, 41 is sucked by the second pump 67, or discharged to the second reservoir 69, so that the pressure in each of the wheel cylinders 38 to 41 will be decreased to reduce the braking force applied to the respective wheel.

When the automatic braking mode is selected at Step S22, the solenoid 120 of the changeover valve 121 is energized (ON) at Step S33, and the first pump 66 is driven at Step S34 to supply the brake fluid from the reservoir 20 to the first pressure chamber 11, whereby the pressure therein is increased. With the pressure increased, the second piston 15 is moved to close the third port 18, thereby to increase the pressure in the second pressure chamber 12. Then, with the solenoids 83 to 90 energized or de-energized, the pressures in the wheel cylinders are regulated. In order to control the braking force, the switching valves 78 to 81 and 62 to 65 may be actuated in the same manner as the traction control mode, or the rotational speed of the motor 82 may be controlled as desired.

If the braking force distribution control in braking is selected at Step S22, the solenoid 120 of the changeover valve 121 is de-energized (OFF) at Step S25. Then, this control is performed at Step S26, where the solenoids 83 to 90 are energized so as to decrease the pressure in each wheel cylinder, whereby the braking force is properly distributed to the right and left wheels. If the braking force distribution control in non-braking is selected at Step S22, the solenoid 120 of the changeover valve 121 is energized (ON) at Step S29. Then, this control is performed at Step S30, where the pump 66 is driven to suck up the brake fluid from the reservoir 20 through the drain passage 108, and increase the pressure in the first pressure chamber 11. With the pressure in the first pressure chamber 11 increased, the second piston 15 is moved to close the third port 18 and increase the pressure in the second pressure chamber 12. Then, the solenoids 83 to 90 are energized or de-energized so as to regulate the pressure in each wheel cylinder. After either one of the modes is performed, one of the above modes is selected at Step S21 again, and the above-described routine will be repeated. Any of the above-described modes may be omitted in this embodiment.

According to the sixth embodiment, in the case where the drain passage 108 communicates with the reservoir 20 through the energized changeover valve 121, and the pump 66 is driven to discharge the pressure in the first pressure control circuit 136, when the brake pedal 13 is in its depressed condition, the reservoir chamber 11a will not communicate with the reservoir 20 until the pressure therein exceeds a predetermined pressure set by the relief valve 42. Thus, the brake pedal 13 is not pushed back when the brake pedal 13 is in its depressed condition, even if the pump 66 is driven to increase the pressure in the master cylinder 10, so that a good feeling in the pedal operation is ensured. In the same case as described above, if the brake pedal 13 is depressed, the brake fluid will be fed from the reservoir 20 into the reservoir chamber 11a through the one way valve 140 to push the first piston 14 forward. Therefore, even in the case where a certain braking force is being applied to a vehicle without any intention of a driver during the traction control operation, the automatic braking operation or the like, a further braking force can be applied to the vehicle as desired by the driver.

In the third to sixth embodiments as described above, the switching valves 78 and 62, the switching valves 79 and 63, the switching valves 80 and 64, and the switching valves 81 and 65 may be replaced by a three-port two-position changeover valve, respectively.

Although the first and second pumps 66, 67 are driven by a single motor 82 in the third to sixth embodiments, a pair of motors may be provided independent from each other, and controlled independently.

In the third to sixth embodiments, the first reservoir 68 is provided for the first anti-lock braking control device. However, the first reservoir 68 may be omitted, provided that the first pump 66 is being driven while the switching valves 62, 63 are open, because the brake fluid drained from the wheel cylinders 38, 39 will be returned to the second port 17 with the first pump 66 driven continuously.

In the third and fourth embodiments, even if the brake pedal 13 is being depressed, when the first pump 66 is driven with the first control valve 24 closed, and with the second control valve 25 opened, the braking force can be increased more than that obtained in response to depression of the brake pedal 13. In this case, the braking forces applied to the four wheels can be re-distributed to effectively prevent the slip of the vehicle in braking operation.

Although the brake pedal 13 is arranged to directly actuate the first piston 14 in the first to sixth embodiments, a booster or the like may be disposed between the first piston 14 and the brake pedal 13.

Figure 10:
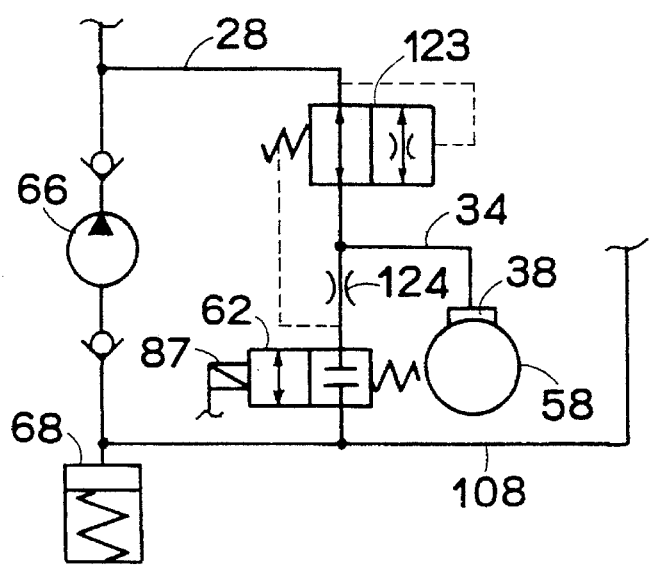
FIG. 10 is a schematic illustration of another embodiment of an anti-lock braking control device according to the present invention.

In the FF or FR vehicles, the traction control is generally made only for two wheels of driven wheels at the right and left of the vehicle. In the above embodiments, provided that the wheels 58 and 60 are arranged for the front wheels and the wheels 59 and 61 are arranged for the rear wheels to provide a diagonal hydraulic circuit (i.e., X hydraulic circuit), and if the pressure in one circuit is increased, the pressure in the other circuit will be increased, so that both the right and left wheels can be controlled, effectively, In the third to sixth embodiments, the anti-lock braking control devices 132, 133 are provided with the switching valves 78, 79, the switching valves 62, 63 and the first pump 66 for the respective wheels, while the anti-lock braking control devices 134, 135 are provided with the switching valves 80, 81, the switching valves 64, 65 and the second pump 67 for the respective wheels. In lieu of the switching valves 78 to 81, however, orifices may be provided. For instance, as shown in FIG. 10, a throttling valve 123 may be provided, in lieu of the switching valve 78, between the passages 28 and 34 for changing a position between an open position to provide the normal communication and a throttling position to provide an orifice, and also an orifice 124 is provided between the passage 34 and the switching valve 62. The throttling valve 123 is actuated in response to a pressure difference between the passage 28 and a passage connecting the orifice 124 and the switching valve 62. If the pressure in the passage 28 exceeds the pressure in the passage between the orifice 124 and the switching valve 62 by more than a predetermined pressure, the passage 28 and the passage 34 will communicate with each other through the orifice provided in the throttling valve 123. According to this embodiment, therefore, in the case where the throttling valve 123 is positioned so as to provide the normal passage and the switching valve 62 is closed, the pressure in the wheel cylinder 38 will be increased. When the switching valve 62 is opened, the throttling valve 123 is changed to the position to provide the orifice, so that the pressure in the wheel cylinder 38 will be decreased. The anti-lock braking control devices 133, 134 and 135 may also be constituted in the same manner as described above.

Figure 11:
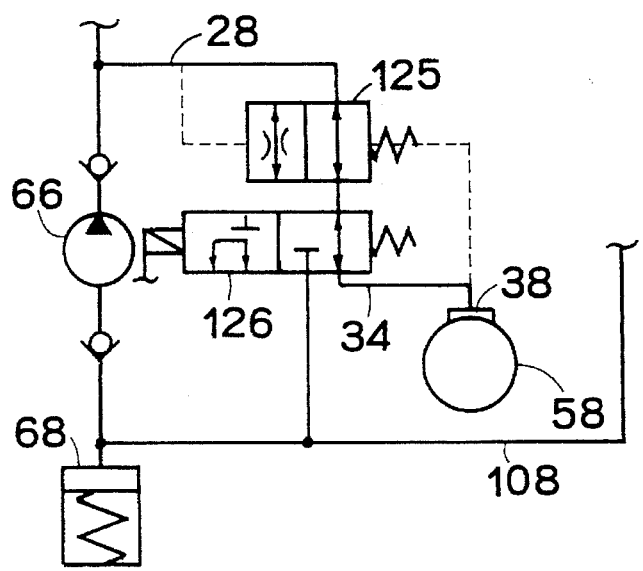
FIG. 11 is a schematic illustration of a further embodiment of an anti-lock braking control device according to the present invention.

As for the anti-lock braking control device 132, a throttling valve 125 as shown in FIG. 11 may be provided in the passage 28, and a three-port two-position changeover valve 126 may be provided between the throttling valve 125 and the passages 34 and 108. The throttling valve 125 is actuated in response to a pressure difference between the passages 28 and 34, such that the throttling valve 125 is changed to the position to provide the orifice, when the pressure in the passage 28 exceeds the pressure in the passage 34 by more than a predetermined pressure. According to this embodiment, when the changeover valve 126 is changed to the position to connect the passage 34 and the throttling valve 125, the passage 28 communicates with the wheel cylinder 38 to increase the pressure therein. When the changeover valve 126 is changed to the position to connect the passage 34 and the passage 108, the passage 108 communicates with the wheel cylinder 38 to decrease the pressure therein. The anti-lock braking control devices 133, 134 and 135 may also be constituted in the same manner as described above.

Figure 12:
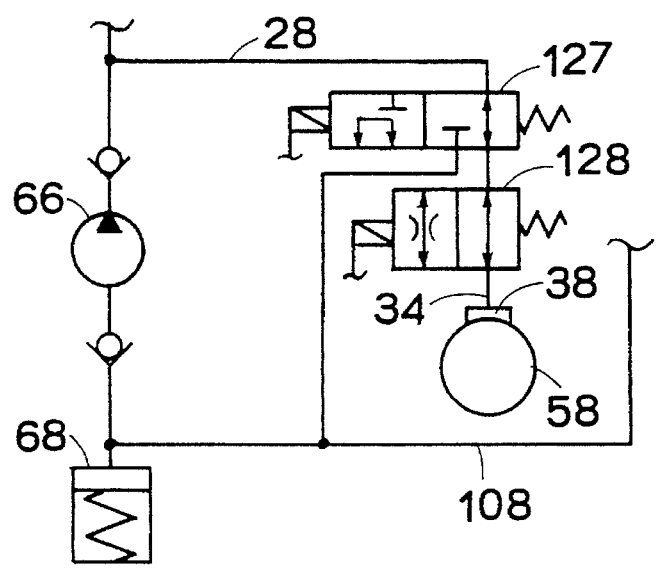
FIG. 12 is a schematic illustration of a yet further embodiment of an anti-lock braking control device according to the present invention.

As for the anti-lock braking control device 132, a throttling valve 128 as shown in FIG. 12 may be provided in the passage 34, and a three-port two-position changeover valve 127 may be provided between the throttling valve 128 and the passages 28 and 108. According to this embodiment, when the changeover valve 127 is changed to the position to connect the passage 28 and the throttling valve 128, the passage 28 communicates with the wheel cylinder 39 to increase the pressure therein. When the changeover valve 127 is changed to the position to connect the throttling valve 128 and the passage 108, the passage 108 communicates with the wheel cylinder 39 to decrease the pressure therein.

Figure 13:
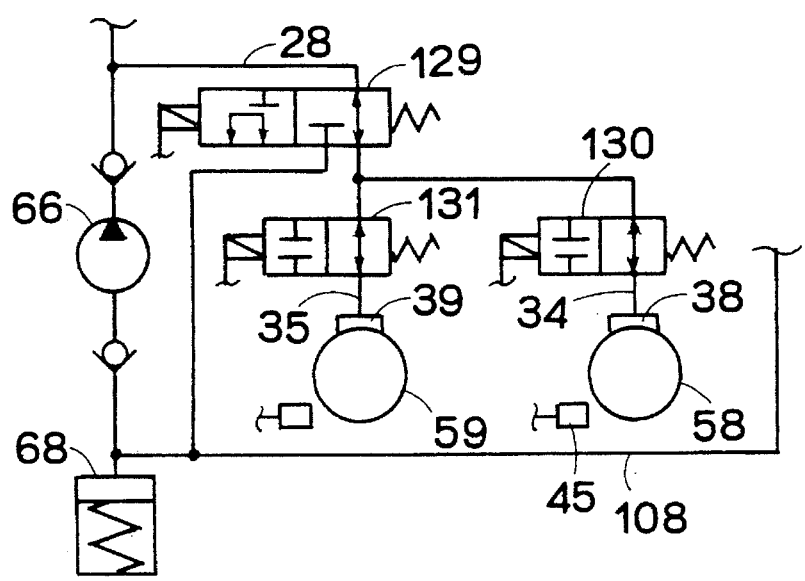
FIG. 13 is a schematic illustration of a further embodiment of an anti-lock braking control device according to the present invention.

In the third to sixth embodiments, the anti-lock braking control devices 132, 133 may be arranged as shown in FIG. 13, wherein switching valves 130 and 131 are provided in the passages 34 and 35, respectively, and a three-port two-position changeover valve 129 is provided between the switching valves 130, 131 and the passages 28 and 108. According to this embodiment, with the switching valves 130 and 131 opened, when the changeover valve 129 is changed to the position to communicate the passage 28 with the switching valves 130, 131, the passage 28 communicates with the wheel cylinders 38, 39 to increase the pressure therein. When the changeover valve 129 is changed to the position to communicate the passage 108 with the switching valves 130, 131, the passage 28 communicates with the wheel cylinders 38, 39 to decrease the pressure therein. And, when the switching valves 130 or 131 is closed, the pressure in the wheel cylinder 38 or 39 is held. With the changeover valves 130, 131 opened or closed alternately, the pressure in the wheel cylinder 38 or 39 will be regulated alternately. The anti-lock braking control devices 134, 135 may be constituted in the same manner as described above.

Thus, in the above embodiments, the anti-lock braking control devices 132 to 135 may be constituted in any manner to enable the wheel cylinder pressure to be regulated into a pressure between the passage 28 or 29 and the passage 108 or 109. The reservoir 68 may be omitted in the embodiments as shown in FIGS. 10 to 13.

Figure 14:
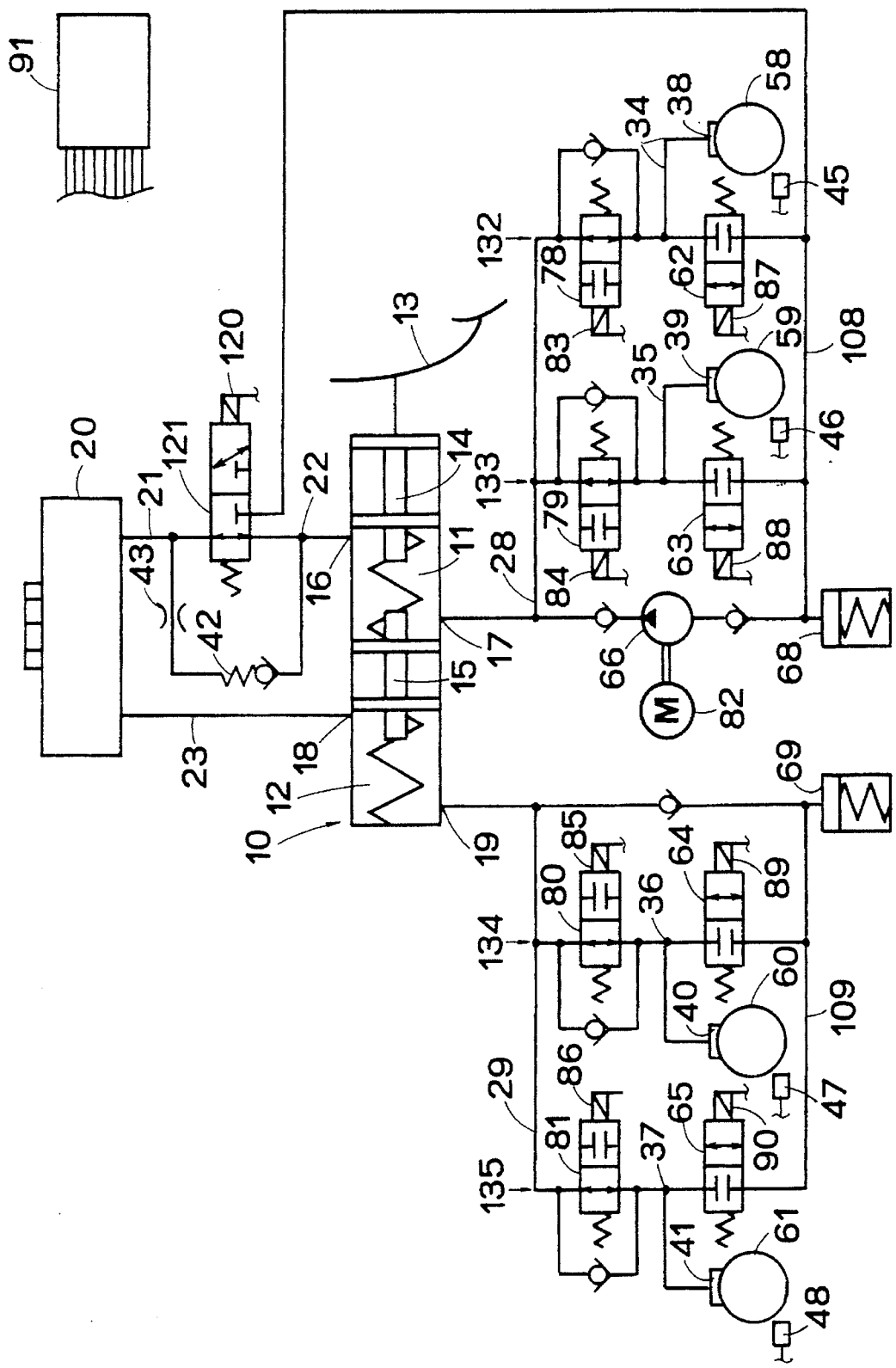
FIG. 14 is a schematic illustration of a modified embodiment of a hydraulic braking system according to the present invention.

FIG. 14 illustrates an embodiment wherein the second pump 67 is omitted from the fourth embodiment in FIG. 8 of the present invention. According to this embodiment, the amount of brake fluid, which can be decreased when the pressure in the wheel cylinder 40 or 41 is to be decreased, is limited to a certain amount in dependence on the capacity of the reservoir 69, but this embodiment enables appropriate controls without the second pump 67 to provide a low cost apparatus. With respect to the sixth embodiment as shown in FIG. 16, the second pump 67 may be omitted, as well.

Figure 15:
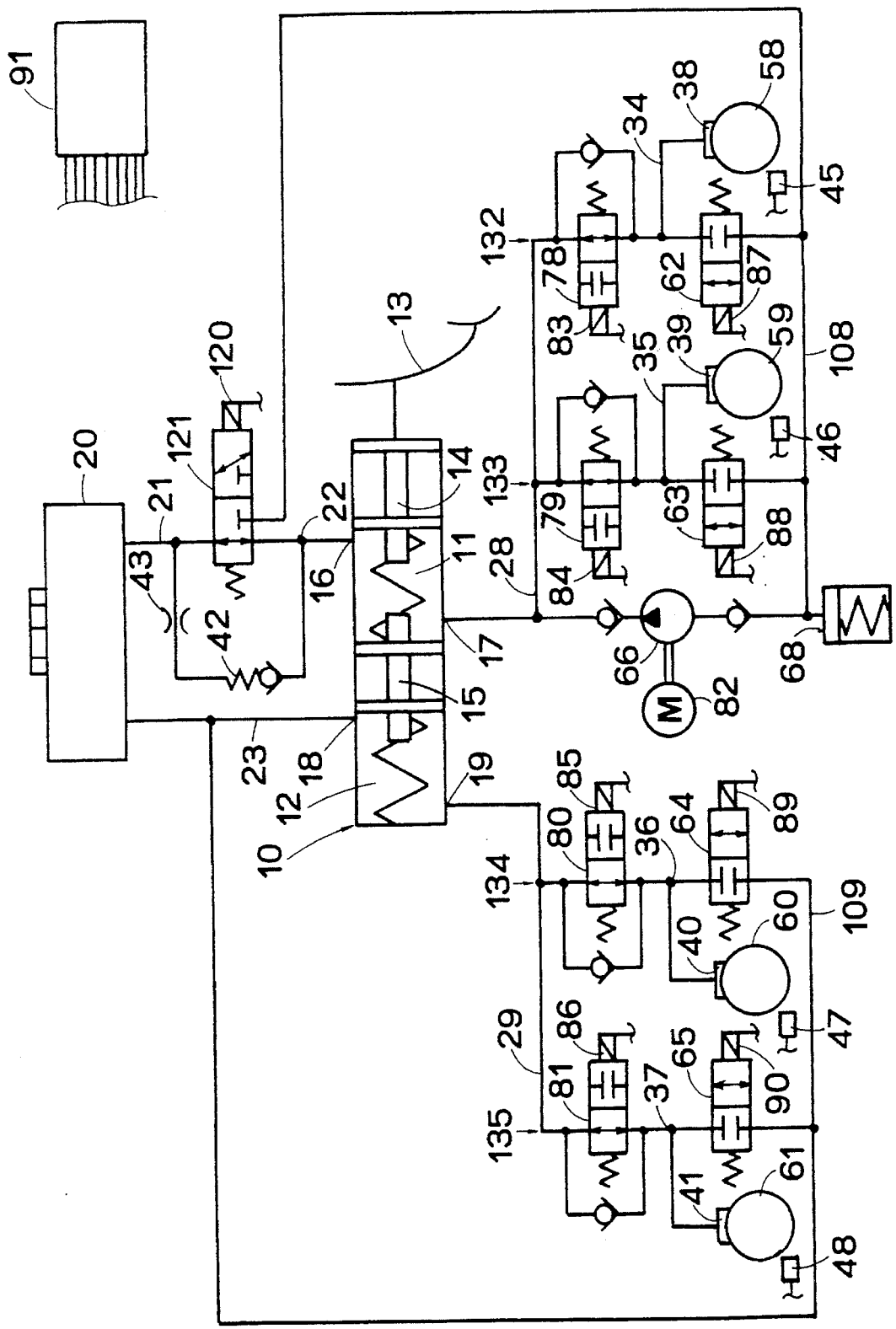
FIG. 15 is a schematic illustration of another modified embodiment of a hydraulic braking system according to the present invention.

FIG. 15 illustrates an embodiment wherein the second pump 67 and the reservoir 69 are omitted, and the drain passage 109 is connected to the reservoir 20, comparing with the fourth embodiment in FIG. 8. According to this embodiment, the second piston 15 is actuated to move the brake pedal 13 gradually, when the pressure in the wheel cylinders 40, 41 is decreased, because the amount of the brake fluid in the second chamber 12 is reduced. However, if the repetition of the increasing operation and decreasing operation of the pressure is made as few as possible, and the opening operation of the switching valves 64, 65 is made as few as possible, any serious problem will not be caused, and appropriate controls will be made without the second pump 67 and the reservoir 69 to provide a low cost apparatus.

In the hydraulic braking system according to the present invention, therefore, once one circuit including the first pressure control device is pressurized by means of the pump with the first valve device or the first control valve closed, the other circuit including the second pressure control device will be pressurized, so that the system can be constituted with a simple structure at a low cost comparing with the system proposed in the prior arts. In the hydraulic braking system provided with the first and second anti-lock braking control devices, if the second valve device or the second control valve is closed, the brake fluid will not flow from the reservoir to the first drain passage, so that the amount of brake fluid in the circuit to be controlled will be maintained at a certain level to avoid a pedal-kickback phenomenon.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic braking system for an automotive vehicle, comprising;

a master cylinder having a housing defining therein a bore, a first piston slidably disposed in said bore and moved in response to depression of a brake pedal, a second piston slidably disposed in said bore at the side of said first piston opposite to said brake pedal, said first piston and said second piston defining therebetween a first pressure chamber communicating with a first port and a second port formed on said housing, said second piston defining at the side thereof opposite to said first chamber a second chamber communicating with a third port and a fourth port formed on said housing, said first piston blocking the communication between said first port and said first pressure chamber, and said second piston blocking the communication between said third port and said second pressure chamber, respectively, with said brake pedal depressed;

a reservoir for storing an amount of brake fluid, said reservoir communicating with said third port of said master cylinder;

first valve means for opening or closing the communication between said first port of said master cylinder and said reservoir;

pump means having an input port communicating with said reservoir, and an output port communicating with said second port of said master cylinder, said pump means sucking the brake fluid from said reservoir and discharging the pumped brake fluid to said second port;

a plurality of wheel cylinders operatively mounted on respective wheels for braking said wheels, said wheel cylinders being divided into a first group of wheel cylinders and a second group of wheel cylinders;

first pressure control means provided between said second port of said master cylinder and said first group of wheel cylinders for controlling the pressure in said second port;

second pressure control means provided between said fourth port of said master cylinder and said second group of wheel cylinders for controlling the pressure in said fourth port; and valve control means for actuating said first valve means to open or close the communication between said first port of said master cylinder and said reservoir in accordance with a mode selected from an opening mode and a closing mode.

2. A hydraulic braking system for an automotive vehicle as set forth in claim 1, wherein said first pressure control means includes a switching valve for opening or closing the communication between said second port of said master cylinder and a wheel cylinder of said first group of wheel cylinders, and wherein said second pressure control means includes a switching valve for opening or closing the communication between said fourth port of said master cylinder and a wheel cylinder of said second group of wheel cylinders.

3. A hydraulic braking system for an automotive vehicle as set forth in claim 1, further comprising a relief valve provided in parallel with said first valve means, said relief valve allowing the flow of brake fluid from said first port to said reservoir with a pressure difference between said first port and said reservoir exceeded a predetermined pressure.

4. A hydraulic braking system for an automotive vehicle, comprising;

a master cylinder having a housing defining therein a bore, a first piston slidably disposed in said bore and moved in response to depression of a brake pedal, a second piston slidably disposed in said bore at the side of said first piston opposite to said brake pedal, said first piston and said second piston defining therebetween a first pressure chamber communicating with a first port and a second port formed on said housing, said second piston defining at the side thereof opposite to said first chamber a second chamber communicating with a third port and a fourth port formed on said housing, said first piston blocking the communication between said first port and said first pressure chamber, and said second piston blocking the communication between said third port and said second pressure chamber, respectively, with said brake pedal depressed;

a reservoir for storing an amount of brake fluid, said reservoir communicating with said third port of said master cylinder;

first valve means for opening or closing the communication between said first port of said master cylinder and said reservoir;

a plurality of wheel cylinders operatively mounted on respective wheels for braking said wheels, said wheel cylinders being divided into a first group of wheel cylinders and a second group of wheel cylinders;

first anti-lock braking control means for controlling the pressure supplied from said second port of said master cylinder to said first group of wheel cylinders, said first anti-lock braking control means including an inlet valve provided between said second port and said first group of wheel cylinders respectively, a first drain passage for communicating said first group of wheel cylinders with said reservoir through an outlet valve provided in said first drain passage, respectively, and a first pump provided between said second port and said first drain passage, said first pump sucking the brake fluid from said first drain passage and discharging the pumped brake fluid to said second port;

second anti-lock braking control means for controlling the pressure supplied from said fourth port of said master cylinder to said second group of wheel cylinders;

second valve means for opening or closing the communication between said first drain passage and said reservoir; and valve control means for actuating said first valve means and said second valve means in accordance with a mode selected from a first mode for opening said first valve means and closing said second valve means, and a second mode for closing said first valve means and opening said second valve means.

5. A hydraulic braking system for an automotive vehicle as set forth in claim 4, wherein said inlet valve comprises a switching valve for opening or closing a passage therein.

6. A hydraulic braking system for an automotive vehicle as set forth in claim 4, wherein said inlet valve comprises a throttling valve for opening or throttling a passage therein.

7. A hydraulic braking system for an automotive vehicle as set forth in claim 4, wherein said second anti-lock braking control means includes an inlet valve provided between said fourth port and said second group of wheel cylinders respectively, a second drain passage for communicating said second group of wheel cylinders with said reservoir through an outlet valve provided in said second drain passage, respectively.

8. A hydraulic braking system for an automotive vehicle as set forth in claim 7, wherein said second anti-lock braking control means further includes a second pump provided between said fourth port of said master cylinder and said second drain passage, said second pump sucking the brake fluid from said second drain passage and discharging the pumped brake fluid to said fourth port.

9. A hydraulic braking system for an automotive vehicle as set forth in claim 7, wherein said second valve means comprises a pressure responsive switching valve for opening or closing a passage therein in response to a difference between the pressure in said first port and the pressure in said second port.

10. A hydraulic braking system for an automotive vehicle as set forth in claim 7, wherein an auxiliary reservoir is provided in said first drain passage.

11. A hydraulic braking system for an automotive vehicle as set forth in claim 7, wherein said first anti-lock braking control means comprises a three-port two-position valve having a first port connected to said wheel cylinder, a second port connected to said second port of said master cylinder, and a third port connected to said first drain passage, and wherein said second anti-lock braking control means comprises a three-port two-position valve having a first port connected to said wheel cylinder, a second port connected to said fourth port of said master cylinder, and a third port connected to said second drain passage.

12. A hydraulic braking system for an automotive vehicle as set forth in claim 4, wherein said second anti-lock braking control means includes an inlet valve provided between said fourth port and said second group of wheel cylinders respectively, a second drain passage for communicating said second group of wheel cylinders with said fourth port through an outlet valve provided in said second drain passage, respectively, and wherein an auxiliary reservoir is provided in said second drain passage between said outlet valve and said fourth port.

13. A hydraulic braking system for an automotive vehicle as set forth in claim 12, wherein an auxiliary reservoir is provided in said first drain passage.

14. A hydraulic braking system for an automotive vehicle as set forth in claim 12, wherein said first anti-lock braking control means comprises a three-port two-position valve having a first port connected to said wheel cylinder, a second port connected to said second port of said master cylinder, and a third port connected to said first drain passage, and wherein said second anti-lock braking control means comprises a three-port two-position valve having a first port connected to said wheel cylinder, a second port connected to said fourth port of said master cylinder, and a third port connected to said second drain passage.

15. A hydraulic braking system for an automotive vehicle as set forth in claim 4, wherein said second anti-lock braking control means includes an inlet valve provided between said fourth port and said second group of wheel cylinders respectively, a second drain passage for communicating said second group of wheel cylinders with said reservoir through an outlet valve provided in said second drain passage, respectively.

16. A hydraulic braking system for an automotive vehicle, comprising;

a master cylinder having a housing defining therein a bore, a first piston slidably disposed in said bore and moved in response to depression of a brake pedal, a second piston slidably disposed in said bore at the side of said first piston opposite to said brake pedal, said first piston and said second piston defining therebetween a first pressure chamber communicating with a first port and a second port formed on said housing, said second piston defining at the side thereof opposite to said first chamber a second chamber communicating with a third port and a fourth port formed on said housing, said first piston blocking the communication between said first port and said first pressure chamber, and said second piston blocking the communication between said third port and said second pressure chamber, respectively, with said brake pedal depressed;

a reservoir for storing an amount of brake fluid, said reservoir communicating with said third port of said master cylinder;

a plurality of wheel cylinders operatively mounted on respective wheels for braking said wheels, said wheel cylinders being divided into a first group of wheel cylinders and a second group of wheel cylinders;

first anti-lock braking control means for controlling the pressure supplied from said second port of said master cylinder to said first group of wheel cylinders, said first anti-lock braking control means including an inlet valve provided between said second port and said first group of wheel cylinders respectively, a first drain passage for communicating said first group of wheel cylinders with said reservoir through an outlet valve provided in said first drain passage, respectively, and a first pump provided between said second port and said first drain passage, said first pump sucking the brake fluid from said first drain passage and discharging the pumped brake fluid to said second port;

second anti-lock braking control means for controlling the pressure supplied from said fourth port of said master cylinder to said second group of wheel cylinders;

third valve means for selecting one of a first position for communicating said reservoir with said first port and blocking the communication between said reservoir and said first drain passage, and a second position for communicating said reservoir with said first drain passage and blocking the communication between said reservoir and said first port; and valve control means for actuating said third valve means in accordance with a mode selected from a first mode for selecting said first position, and a second mode for selecting said second position.

17. A hydraulic braking system for an automotive vehicle as set forth in claim 16, wherein said second anti-lock braking control means includes an inlet valve provided between said fourth port and said second group of wheel cylinders respectively, a second drain passage for communicating said second group of wheel cylinders with said reservoir through an outlet valve provided in said second drain passage, respectively.

18. A hydraulic braking system for an automotive vehicle as set forth in claim 17, wherein said second anti-lock braking control means further includes a second pump provided between said fourth port of said master cylinder and said second drain passage, said second pump sucking the brake fluid from said second drain passage and discharging the pumped brake fluid to said fourth port.

19. A hydraulic braking system for an automotive vehicle as set forth in claim 16, wherein said second anti-lock braking control means includes an inlet valve provided between said fourth port and said second group of wheel cylinders respectively, a second drain passage for communicating said second group of wheel cylinders with said fourth port through an outlet valve provided in said second drain passage, respectively, and wherein an auxiliary reservoir is provided in said second drain passage between said outlet valve and said fourth port.

20. A hydraulic braking system for an automotive vehicle, comprising;

a master cylinder having a housing defining therein a bore, a first piston slidably disposed in said bore and moved in response to depression of a brake pedal, a second piston slidably disposed in said bore at the side of said first piston opposite to said brake pedal, said first piston and said second piston defining therebetween a first pressure chamber communicating with a first port and a second port formed on said housing, said second piston defining at the side thereof opposite to said first chamber a second chamber communicating with a third port and a fourth port formed on said housing, said first piston defining at the side thereof opposite to said first chamber a reservoir chamber communicating with a fifth port formed on said housing and having a volume varied in response to depression of said brake pedal, said first piston blocking the communication between said first port and said first pressure chamber, and said second piston blocking the communication between said third port and said second pressure chamber, respectively, with said brake pedal depressed;

a reservoir for storing an amount of brake fluid, said reservoir communicating with said third port of said master cylinder;

a plurality of wheel cylinders operatively mounted on respective wheels for braking said wheels, said wheel cylinders being divided into a first group of wheel cylinders and a second group of wheel cylinders;

first anti-lock braking control means for controlling the pressure supplied from said second port of said master cylinder to said first group of wheel cylinders, said first anti-lock braking control means including an inlet valve provided between said second port and said first group of wheel cylinders respectively, a first drain passage for communicating said first group of wheel cylinders with said reservoir through an outlet valve provided in said first drain passage, and a first pump provided between said second port and said drain passage, respectively;

second anti-lock braking control means for controlling the pressure supplied from said fourth port of said master cylinder to said second group of wheel cylinders;

fourth valve means for selecting one of a first position for communicating said reservoir with said first port and said fifth port and blocking the communication between said reservoir and said drain passage, and a second position for communicating said reservoir with said drain passage and blocking the communication between said reservoir and said first and fifth ports; and valve control means for actuating said fourth valve means in accordance with a mode selected from a first mode for selecting said first position, and a second mode for selecting said second position.

21. A hydraulic braking system for an automotive vehicle as set forth in claim 20, further comprising one way valve means for allowing the brake fluid to flow from said reservoir to said fifth port and preventing the brake fluid from flowing in the reverse direction.

22. A hydraulic braking system for an automotive vehicle as set forth in claim 21, further comprising a relief valve provided in parallel with said first valve means, said relief valve allowing the flow of brake fluid from said first port to said reservoir with a pressure difference between said first port and said reservoir exceeded a predetermined pressure.

23. A hydraulic braking system for an automotive vehicle as set forth in claim 20, wherein an auxiliary reservoir is provided in said first drain passage.

24. A hydraulic braking system for an automotive vehicle as set forth in claim 20, wherein said first anti-lock braking control means comprises a three-port two-position valve having a first port connected to said wheel cylinder, a second port connected to said second port of said master cylinder, and a third port connected to said first drain passage, and wherein said second anti-lock braking control means comprises a three-port two-position valve having a first port connected to said wheel cylinder, a second port connected to said fourth port of said master cylinder, and a third port connected to said second drain passage.

* * * * *